(12) United States Patent
Ramakrishna et al.

(10) Patent No.: US 11,978,438 B1
(45) Date of Patent: May 7, 2024

(54) MACHINE LEARNING MODEL UPDATING

(71) Applicant: Amazon Technologies, Inc., Seattle, WA (US)

(72) Inventors: Anil K. Ramakrishna, Los Angeles, CA (US); Rahul Gupta, Waltham, MA (US); Yuval Merhav, Cambridge, MA (US); Zefei Li, Cambridge, MA (US); Heather Brooke Spetalnick, Scotch Plains, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 307 days.

(21) Appl. No.: 17/215,383

(22) Filed: Mar. 29, 2021

(51) Int. Cl.
G10L 15/18 (2013.01)
G06N 20/00 (2019.01)
G10L 15/06 (2013.01)
G10L 25/27 (2013.01)

(52) U.S. Cl.
CPC .......... *G10L 15/1815* (2013.01); *G06N 20/00* (2019.01); *G10L 15/063* (2013.01); *G10L 25/27* (2013.01)

(58) Field of Classification Search
CPC ... G10L 15/1815; G10L 15/063; G10L 25/27; G06N 20/00
See application file for complete search history.

(56) References Cited

U.S. PATENT DOCUMENTS

| | | | |
|---|---|---|---|
| 2019/0102675 A1* | 4/2019 | Biswas | G06N 3/045 |
| 2019/0108832 A1* | 4/2019 | Tomar | G10L 15/16 |
| 2020/0364303 A1* | 11/2020 | Liu | G10L 15/16 |
| 2021/0117629 A1* | 4/2021 | Lee | G06N 3/08 |
| 2021/0232981 A1* | 7/2021 | Sundaresan | H04L 9/32 |
| 2021/0286598 A1* | 9/2021 | Luo | G06N 3/084 |
| 2021/0406838 A1* | 12/2021 | Ramanath | G06N 20/20 |
| 2022/0261631 A1* | 8/2022 | Cohen | G06N 20/00 |

FOREIGN PATENT DOCUMENTS

| | | | | |
|---|---|---|---|---|
| CN | 103415825 A | * | 11/2013 | G06F 3/017 |
| CN | 109658928 A | * | 4/2019 | G06F 40/284 |

* cited by examiner

*Primary Examiner* — Daniel C Washburn
*Assistant Examiner* — Paul J. Mueller
(74) *Attorney, Agent, or Firm* — Pierce Atwood LLP

(57) ABSTRACT

Techniques for updating a machine learning (ML) model are described. A device or system may receive input data corresponding to a natural or non-natural language (e.g., gesture) input. Using a first ML model, the device or system may determine the input data corresponds to a data category of a plurality of data categories. Based on the data category, the device or system may select a ML training type from among a plurality of ML training types. Using the input data, the device or system may perform the selected ML training type with respect to a runtime ML model to generate an updated ML model.

21 Claims, 14 Drawing Sheets

MACHINE LEARNING MODEL UPDATING

BACKGROUND

Natural language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
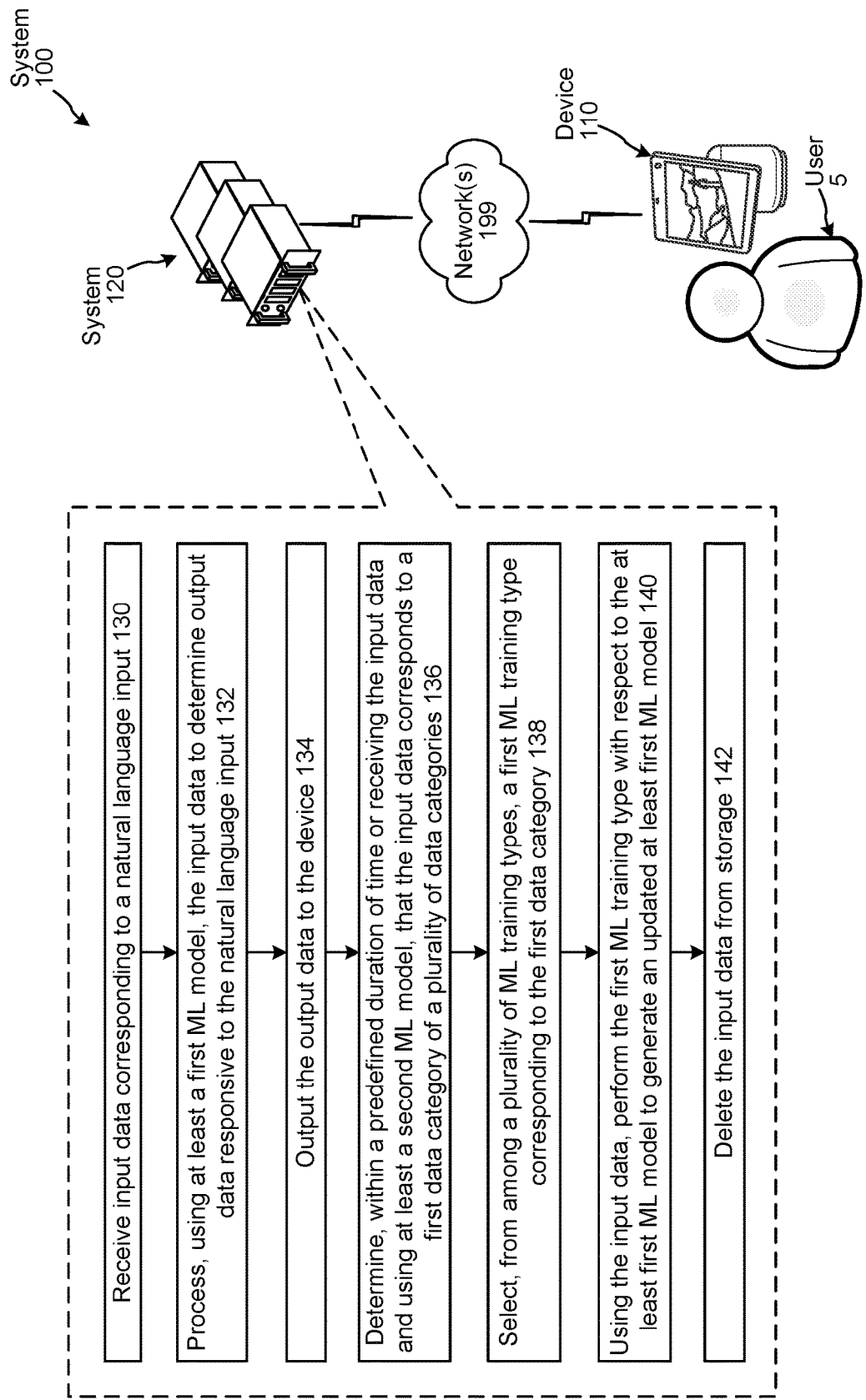
FIG. 1 is a conceptual diagram illustrating a system configured to update a machine learning (ML) model, according to embodiments of the present disclosure.

Automatic speech recognition (ASR) is a field of computer science, artificial intelligence, and linguistics concerned with transforming audio data associated with speech into a token or textual representation of that speech. Natural language understanding (NLU) is a field of computer science, artificial intelligence, and linguistics concerned with enabling computers to derive meaning from natural language inputs (such as spoken inputs). ASR and NLU are often referred to collectively as spoken language understanding (SLU). Text-to-speech (TTS) is a field of computer science concerning transforming textual and/or other data into audio data that is synthesized to resemble human speech.

A speech processing system may be configured to perform actions responsive to utterances (i.e., spoken natural language inputs). For example, for the utterance "play music by [artist name]," the speech processing system may output music sung by the indicated artist. For further example, for the utterance "turn on the lights," the speech processing system may turn on lights based on where the user is located. In another example, for the utterance "what is today's weather," the speech processing system may output synthesized speech of weather information based on where the user is located.

The speech processing system may use one or more machine learning (ML) models to perform processing with respect to an utterance. For example, the speech processing system may perform ASR processing, using one or more ASR models, to generate ASR output data representing the words in the utterance. The speech processing system may thereafter process the ASR output data using one or more intent classification (IC) models, one or more named entity recognition (NER) models, and/or one or more domain classification (DC) models to generate NLU output data corresponding to the utterance. Alternatively, the speech processing system may perform SLU processing, using one or more ML models, to generate the NLU output data corresponding to the utterance.

An IC model is a ML model configured to determine an intent of a natural language input, including but not limited to an utterance. A NER model is a ML model configured to determine one or more entities represented in a natural language input. A DC model is a ML model configured to determine a domain to which a natural language input corresponds. A domain, as used herein, may include various applications (also referred to as skills) relating to a particular area of interest. For example, a music domain may include various skills that can respond to a user's request to play music, enable a user to purchase music, etc. In another example, a smart-home domain may include skills that enable a user to control various home devices. A SLU model is a ML model configured to determine NLU output data from input audio data corresponding to an utterance.

The present disclosure provides, among other things, techniques for updating ML models to account for variations and patterns in natural language inputs. According to the present disclosure, a speech processing system may use a first ML model to categorize input data into one of various data categories. Each data category may be associated with a different ML training technique. For example, a first data category may be associated with unsupervised training, a second data category may be associated with weakly supervised training, a third data category may be associated with supervised training, etc.

The first ML model's categorization of input data may cause a second ML model (i.e., a ML model currently being used for runtime processing) to be updated in various manners. In some instances, various input data (i.e., at least more than one instance of input data) may be used to update of the second ML model, and the first ML model may categorize the various input data into different data categories, resulting in the second ML model being updated using different ML training techniques based on the categorized input data. For example, the first ML model may categorize first input data into a first data category corresponding to unsupervised training, and may categorize second input data into a second data category corresponding to weakly supervised training, resulting in the second ML model being updated using both unsupervised and weakly supervised training.

Based on the foregoing, it will be appreciated that, in at least some instances, the first ML model may categorize input data such that unsupervised ML training is performed using the input data, where the input data does not need to be manually annotated for training. Such increases user privacy as the unsupervised ML training alleviates the need for a human annotator to have access to the input data.

The ML model updating techniques of the present disclosure may be performed automatically by the speech processing system on a periodic basis (e.g., daily, weekly, monthly, quarterly, etc.). In some embodiments, the ML model updating techniques may be performed instantaneously, or nearly instantaneously, when training data becomes available (e.g., a natural language input is received). After using input data to update a ML model, the speech processing system may delete the input data. As such, teachings of the present disclosure also increase user privacy by decreasing the period of time that the speech processing or other machine learning system stores input data for ML model training purposes.

The present disclosure also improves the runtime user experience as an aspect of the present disclosure is to continually update ML models to account for variations and patterns in natural language inputs. For example, a new song may become popular and thus be represented in recent natural language inputs. The teachings of the present disclosure may be used to update a NLU model(s) (e.g., NER model) to identify the new song.

Teachings of the present disclosure combine automation and continual updating of machine learning models to enable increased user privacy while also providing a better user experience and reduce developer workload.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 shows a system 100 configured to update a ML model. Although the figures and discussion of the present disclosure illustrate certain processes in a particular order, the processes described may be performed in a different order (as well as certain processes removed or added) without departing from the present disclosure.

As shown in FIG. 1, the system 100 may include a device 110, local to a user 5, in communication with a system 120 across a network(s) 199. The user 5 may provide a natural language input to the device 110 using a text-entry device, such as a keyboard or touchscreen, using an audio-capture device, such as a microphone, etc. The device 110 may include an output device, such as a screen, touchscreen, loudspeaker, haptic-feedback device, etc., for relaying communications from the system 120 to the user 5. The network 199 may include the Internet and/or any other wide- or local-area network, and may include wired, wireless, and/or cellular network hardware. While the user 5 is illustrated as a human, it will be appreciated that the present disclosure is not limited thereto, and that the user 5 may be a non-human such as an application, bot, or the like.

While the present disclosure includes specific examples for updating certain types of ML models, it will be appreciated that the examples are merely illustrative, and that the present disclosure is not limited thereto. The ML model update techniques of the present disclosure may be used to update ML models for performing ASR processing, NLU processing, feature extraction processing, gesture detection processing, object recognition processing, computer vision processing, search ranking, product recommendation processing, and other processing using ML models.

The device 110 may receive a natural language input from the user 5. For example, the device 110 may receive audio corresponding to an utterance (i.e., a spoken natural language input). In another example, the device 110 may receive a textual natural language input via a keyboard or touchscreen.

The device 110 sends (and the system 120 receives (130)) input data corresponding to the natural language input. For example, the input data may be audio data when the device 110 receives an utterance. In another example, the input data may be text data when the device 110 receives a textual natural language input.

After receiving the input data, the system 120 processes (132), using at least a first ML model, the input data to determine output data responsive to the natural language input. For example, if the input data is audio data, the system 120 may use one or more ASR models (as described with respect to FIG. 2) to perform ASR processing on the audio data to generate ASR output data. The system 120 may thereafter use one or more IC models, one or more NER models, and/or one or more DC models to perform NLU processing on the ASR output data to generate NLU output data. Alternatively, the system 120 may use one or more SLU models to perform SLU processing on the audio data to generate the NLU output data, without first generating the ASR output data. When the input data is text data, the system 120 may use one or more IC models, one or more NER models, and/or one or more DC models to perform NLU processing on the text data to generate the NLU output data. A skill, as described in further detail herein below, may process the NLU output data to generate the output data (which may sometimes be referred to as response data as it is considered to be responsive to the natural language input).

The system 120 outputs (134) the output data, for example by sending the output data to the device 110. In some embodiments, the output data may be audio data including synthesized speech. In other embodiments, the output data may be text data. In yet other embodiments, the output data may include both audio data, including synthesized speech, and text data.

The system 120 may update at least the first ML model, using the input data, at near runtime. For example, the system 120 may commence updating the at least first ML model prior to the output data being determined, or immediately following output of the output data. In some embodiments, the system 120 may update the at least first ML model within the same calendar day (or within 24 hours) of receiving the input data.

The system 120 determines (136), within a predefined period of time (e.g., within a minute(s), hour(s), 24 hours, etc.) of receiving the input data and using at least a second ML model, that the input data corresponds to a first data category of a plurality of data categories. For example, one data category may correspond to input data that the second ML model is able to assign at least one label (e.g., intent label, entity label, domain label, etc.) to with sufficient confidence (e.g., a confidence score satisfying a threshold confidence score). For further example, another data category may correspond to input data that is associated with negative user feedback data. In another example, a data category may correspond to input data that is unassociated with any labels. One skilled in the art will appreciate that the foregoing data categories are merely illustrative, and that other data categories may be implemented in accordance with the present disclosure.

The system 120 may select (138), from among a plurality of ML training types, a first ML training type corresponding to the first data category to which the input data corresponds. For example, one data category may be associated with unsupervised learning, another data category may be associated with weakly supervised learning, a further data category may be associated with supervised learning, etc. Thereafter, the system 120 performs (140), using the input data, the first ML training type with respect to at least the first ML model to generate at least an updated first ML model. Specific ML training types are described in further detail herein below.

After generating the updated first ML model, the system 120 deletes (142) the input data from storage, such that the system 120 no longer stores (a copy of) the input data. Such deletion increases user privacy by decreasing the length of time the system 120 has access to the input data.

The above description relating to FIG. 1 describes processing that may be performed to update at least a first ML model using a single instance of input data. However, the present disclosure is not limited thereto. In some instances, the system 120 may perform steps 136-142 with respect to multiple different instances of input data, each corresponding to a different natural language input received by the system 120 per the step 130. As such, there may be instances where a single update (e.g., a single instance of updating or the same update operation) of at least the first ML model includes the use of two or more ML training types and/or a ML training type may be performed with respect to more than one instance of input data (e.g., in the case where the device 110 receives multiple user inputs within the predefined period of time (e.g., within a single 24 hours span).

While the foregoing describes the system 120 performing the processes of FIG. 1 described above, the present disclosure is not limited thereto. In some embodiments, the system 120 may perform a portion of the processes, and the device 110 may perform another portion of the processes. In some embodiments, the device 110 may perform all the processes described above with respect to FIG. 1.

Moreover, in some embodiments, the device 110 may perform some or all of the runtime and/or offline processing described above with respect to FIG. 1.

Figure 2:
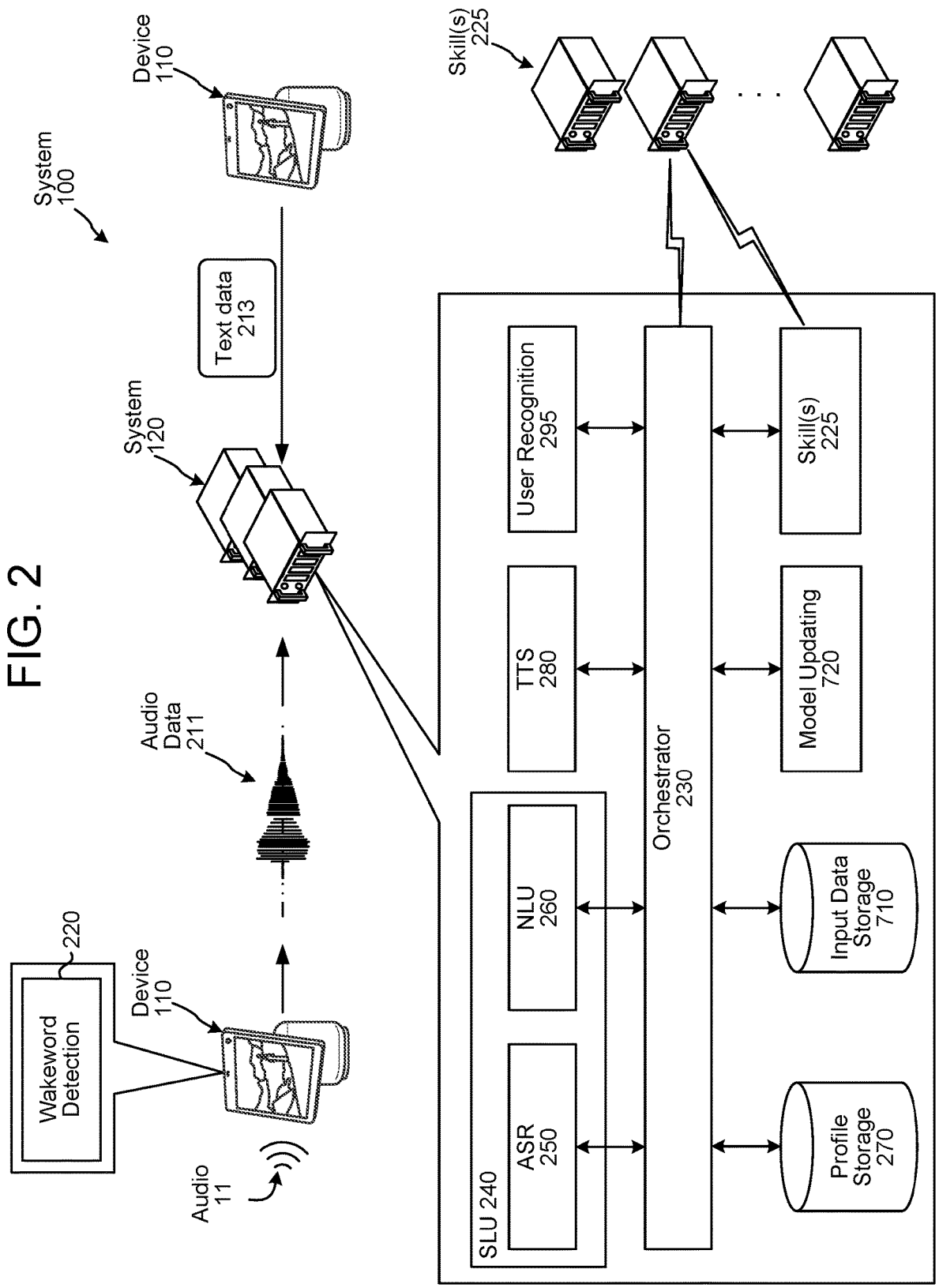
FIG. 2 is a conceptual diagram of components of the system, according to embodiments of the present disclosure.

The system 100 may operate using various components as illustrated in FIG. 2. The various components may be located on a same or different physical devices. Communication between various components may occur directly or across a network(s) 199.

A microphone or array of microphones (of or otherwise associated with the device 110) may capture audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may determine if the speech is directed at the device 110/system 120. In at least some embodiments, such determination may be made using a wakeword detection component 220. The wakeword detection component 220 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 220 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the device 110 may "wake" and begin transmitting audio data 211, representing the audio 11, to the system 120. The audio data 211 may include the detected wakeword, or the device 110 may remove the portion of the audio data, corresponding to the detected wakeword, prior to sending the audio data 211 to the system 120.

The system 120 may include an orchestrator component 230 configured to, among other things, coordinate data transmissions between components of the system 120. The orchestrator component 230 may receive the audio data 211 from the device 110, and send the audio data 211 to an ASR component 250.

Figure 3:
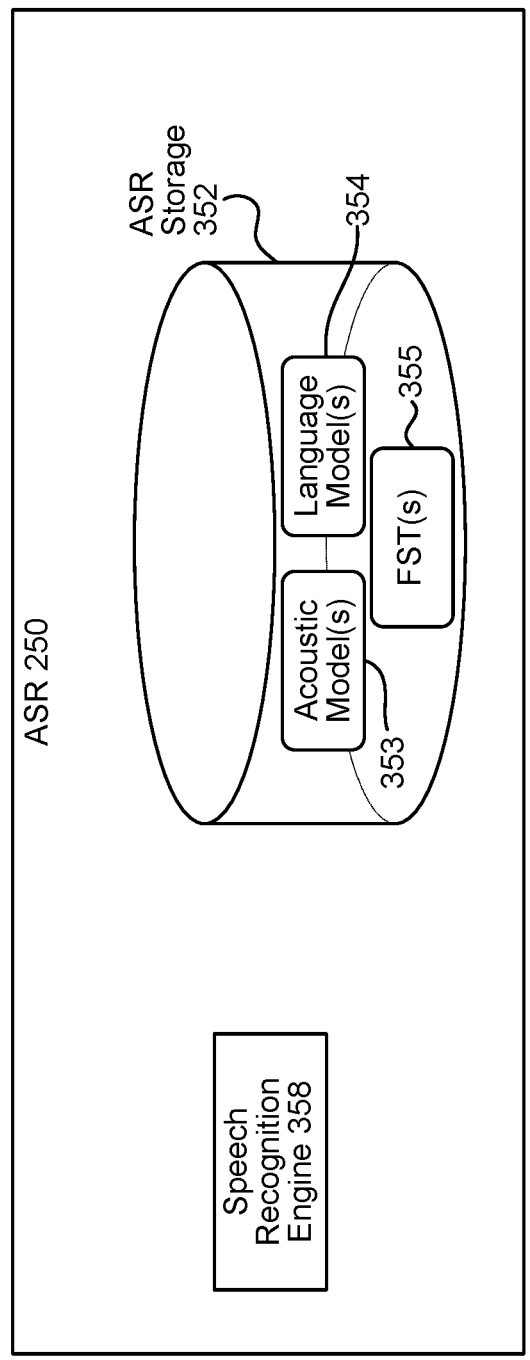
FIG. 3 is a conceptual diagram of an automatic speech recognition (ASR) component, according to embodiments of the present disclosure.

FIG. 3 is a conceptual diagram of the ASR component 250, according to embodiments of the present disclosure. The ASR component 250 may interpret a spoken natural language input based on the similarity between the spoken natural language input and pre-established language models 354 stored in an ASR storage 352. For example, the ASR component 250 may compare the audio data 211 with models for sounds (e.g., subword units or phonemes) and sequences of sounds to identify words that match the sequence of sounds spoken in the natural language input. Alternatively, the ASR component 250 may use a finite state transducer(s) (FST(s)) 355 to implement the language model functions.

When the ASR component 250 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 353 stored in the ASR storage 352), and the likelihood that a particular word, which matches the sounds, would be included in a sentence at the specific location (e.g., using a language model 354). Based on the considered factors and the assigned confidence score, the ASR component 250 may output an ASR hypothesis that most likely matches the spoken natural language input, or may output multiple ASR hypotheses in the form of a lattice or an N-best list, with each ASR hypothesis corresponding to a respective score.

The ASR component 250 may include a speech recognition engine 358. The ASR component 250 receives the audio data 211 (for example, from a device 110 having processed audio detected by a microphone by an acoustic front end (AFE) or other component). The speech recognition engine 358 compares the audio data 211 with one or more acoustic models 353, one or more language models 354, a FST(s) 355, and/or other data models and information for recognizing the speech conveyed in the audio data 211. The audio data 211 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 358 may process the audio data 211 with reference to information stored in the ASR storage 32. Feature vectors of the audio data 211 may arrive at the system 120 encoded, in which case they may be decoded prior to processing by the speech recognition engine 358.

The speech recognition engine 258 attempts to match received feature vectors to language acoustic units (e.g., phonemes) and words as known in the stored acoustic model(s) 353, language model(s) 2B54, and FST(s) 355. For example, the audio data 211 may be processed by one or more acoustic models 353 to determine acoustic unit data. The acoustic unit data may include indicators of acoustic units detected in the audio data 211 by the ASR component 250. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations, a phoneme representation of the audio data 211 can be analyzed using an n-gram based tokenizer. An entity, or a slot representing one or more entities, can be represented by a series of n-grams.

The acoustic unit data may be processed using the language model(s) 354 (and/or using the FST(s) 355) to determine ASR output data. The ASR output data can include one or more hypotheses. One or more of the hypotheses represented in the ASR output data may then be sent to further components (such as the NLU component 260) for further processing as discussed herein. The ASR output data may include representations of text of an utterance, such as words, subword units, or the like.

The speech recognition engine 358 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 250 will output one or more ASR hypotheses that make sense grammatically. The specific models used may be general models or may be models corresponding to a particular domain, such as music, banking, etc.

The speech recognition engine 358 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 358 may use a number of techniques to match feature vectors to phonemes or other acoustic units, such as diphones, triphones, etc. One common technique is using Hidden Markov Models (HMMs).

HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 358, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 358 may also compute scores of branches of the paths based on language models or grammars. Language modeling involves determining scores for what words are likely to be used together to form coherent words and sentences. Application of a language model may improve the likelihood that the ASR component 250 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Referring again to FIG. 2, in at least some instances, instead of the device 110 receiving a spoken natural language input, the device 110 may receive a textual (e.g., typed) natural language input. The device 110 may determine text data 213 representing the textual natural language input, and may send the text data 213 to the system 120, wherein the text data 213 is received by the orchestrator component 230. The orchestrator component 230 may send the text data 213 or ASR output data, depending on the type of natural language input received, to a NLU component 260.

Figure 4:
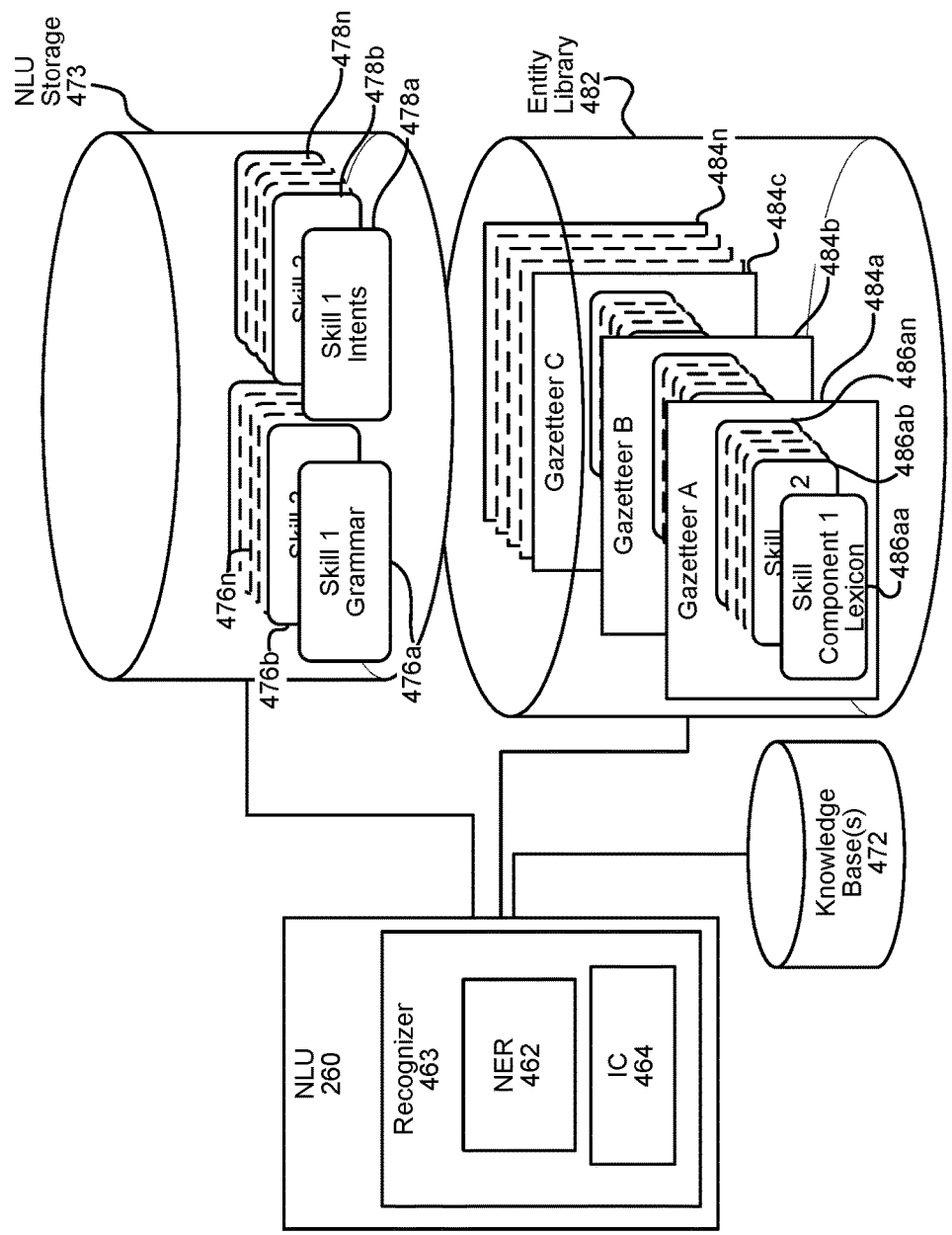
FIG. 4 is a conceptual diagram of how natural language understanding (NLU) processing may be performed, according to embodiments of the present disclosure.

Referring to FIG. 4, it is described how NLU processing may be performed. The NLU component 260 may include one or more recognizers 463. In at least some embodiments, a recognizer 463 may be associated with a skill 225 (e.g., the recognizer may be configured to interpret a natural language input to correspond to the skill 225). In at least some embodiments, a recognizer 463 may be associated with a domain (e.g., the recognizer may be configured to interpret a natural language input to correspond to the domain). A non-limiting list of domains includes a smart home domain, a music domain, a video domain, a flash briefing domain, a shopping domain, a communications domain, and/or a custom domain.

Recognizers 463 may process in parallel, in series, partially in parallel, etc. For example, a recognizer corresponding to a first domain may process at least partially in parallel to a recognizer corresponding to a second domain. For further example, a recognizer corresponding to a first skill may process at least partially in parallel to a recognizer corresponding to a second skill. In another example, a recognizer corresponding to a domain may process at least partially in parallel to a recognizer corresponding to a skill.

The NLU component 260 may communicate with various storages. The NLU component 260 may communicate with a NLU storage 473, which includes skill grammars (476a-476n), representing how natural language inputs may be formulated to invoke skills, and skill intents (478a-478n) representing intents supported by respective skills.

Each recognizer 463 may be associated with a particular grammar 476, one or more particular intents 478, and a particular personalized lexicon 486 (stored in an entity library 482). A gazetteer 484 may include skill-indexed lexical information associated with a particular user. For example, Gazetteer A (484a) may include skill-indexed lexical information 486aa to 486an. A user's music skill lexical information might include album titles, artist names, and song names, for example, whereas a user's contact list skill lexical information might include the names of contacts. Since every user's music collection and contact list is presumably different, this personalized information may improve entity resolution.

Each recognizer 463 may include a named entity recognition (NER) component 462 that attempts to identify grammars and lexical information that may be used to construe meaning with respect to data input thereto. A NER component 462 identifies portions of data that correspond to a named entity. A NER component 462 may also determine whether a word refers to an entity that is not explicitly mentioned in the text, for example "him," "her," "it" or other anaphora, exophora or the like.

A NER component 462 applies grammar models 476 and lexical information 486 associated with one or more skills 225 to determine a mention of one or more entities in data input thereto. In this manner, a NER component 462 identifies "slots" (i.e., particular words in data) that may be used for later processing. A NER component 462 may also label each slot with a type (e.g., noun, place, city, artist name, song name, etc.).

Each grammar model 476 may include the names of entities (e.g., nouns and pronouns) commonly found in natural language about a particular skill 225 to which the grammar model 476 relates, whereas lexical information 486 may be personalized to a user identifier output by a user recognition component 295 for the instant natural language input. For example, a grammar model 476 associated with a shopping skill may include a database of words commonly used when people discuss shopping.

A downstream process called entity resolution links a portion of data (identified by a NER component 462) to a specific entity known to the system 120. To perform entity resolution, the NLU component 260 may use gazetteer information 484 stored in the entity library storage 482. The gazetteer information 484 may be used to match data (identified by a NER component 462) with different entities, such as song titles, contact names, etc. A gazetteer 484 may be linked to a user (e.g., a particular gazetteer 484 may be associated with a specific user's music collection), may be linked to a certain skill (e.g., a shopping skill, a music skill, a video skill, a communications skill, etc.), or may be organized in another manner.

Each recognizer 463 may also include an intent classification (IC) component 464 that processes data input thereto to determine an intent that potentially corresponds to the natural language input. An intent corresponds to an action to be performed that is responsive to the natural language input. An IC component 464 may communicate with a database 478 of words linked to intents. For example, a music intent database may link words and phrases such as "quiet," "volume off," and "mute" to a <Mute> intent. An IC component 464 identifies potential intents by comparing words and phrases in data (input to the IC component 464) to the words and phrases in an intents database 478 associated with the skill 225 that is associated with the recognizer 463 implementing the IC component 464.

The intents identifiable by a specific IC component 464 may be linked to one or more skill-specific grammar frameworks 476 with "slots" to be filled. Each slot of a grammar model 376 corresponds to a portion of data that a NER component 462 believes corresponds to an entity. For example, a grammar framework 476 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar frameworks 476 may not be structured as sentences, but rather based on associating slots with grammatical tags.

For example, a NER component 462 may identify words in data (input to the NER component 462) as subject, object, verb, preposition, etc. based on grammar rules and/or models prior to recognizing named entities in the data. An IC component 464 (implemented by the same recognizer 463 as the NER component 462) may use the identified verb to identify an intent. The NER component 462 may then determine a grammar model 476 associated with the identified intent. For example, a grammar model 376 for a <PlayMusic> intent may specify a list of slots applicable to play the identified "object" and any object modifier (e.g., a prepositional phrase), such as {Artist Name}, {Album Name}, {Song name}, etc. The NER component 462 may then search corresponding fields in a lexicon 486, attempting to match words and phrases in the data the NER component 462 previously tagged as a grammatical object or object modifier with those identified in the lexicon 486.

A NER component 462 may perform semantic tagging, which is the labeling of a word or combination of words according to their type/semantic meaning. A NER component 462 may parse data using heuristic grammar rules, or a model may be constructed using techniques such as HMMs, maximum entropy models, log linear models, conditional random fields (CRF), and the like. For example, a NER component 462, implemented by a music skill or music domain recognizer 463, may parse and tag data corresponding to "play mother's little helper by the rolling stones" as {Verb}: "Play," {Object}: "mother's little helper," {Object Preposition}: "by," and {Object Modifier}: "the rolling stones." The NER component 462 may identify "Play" as a verb based on a word database associated with the music skill or music domain, which an IC component 464 may determine corresponds to a <PlayMusic> intent. At this stage, no determination has been made as to the meaning of "mother's little helper" and "the rolling stones," but based on grammar rules and models, the NER component 462 has determined that the these phrases relate to the grammatical object (i.e., entity).

The frameworks linked to the intent are then used to determine what database fields should be searched to determine the meaning of these phrases, such as searching a user's gazetteer 484 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 484 does not resolve a slot/field, the NER component 462 may search a database of generic words (in a knowledge base 472). For example, if the data (input to the NER component 462) corresponds to "play songs by the rolling stones," after failing to determine an album name or song name called "songs" by "the rolling stones," the NER component 462 may search a music skill vocabulary for the word "songs." In the alternative, generic words may be checked before the gazetteer 484, or both may be tried, potentially producing two different results.

A recognizer 463 may tag data to attribute meaning thereto. For example, a recognizer 463 may tag "play mother's little helper by the rolling stones" as: {skill} Music, {intent} Play Music, {artist name} rolling stones, {media type} song, and {song title} mother's little helper. For further example, a recognizer 463 may tag "play songs by the rolling stones" as: {skill} Music, {intent} Play Music, {artist name} rolling stones, and {media type} song.

As described above, more than one recognizer 463 may process with respect to data representing a single natural language input. In such instances, each recognizer 463 may output at least one NLU hypothesis, with each NLU hypothesis including an intent (determined by an IC component 464 of the recognizer 463) and optionally at least one tagged named entity (determined by a NER component 462 of the recognizer 463).

Figure 5:
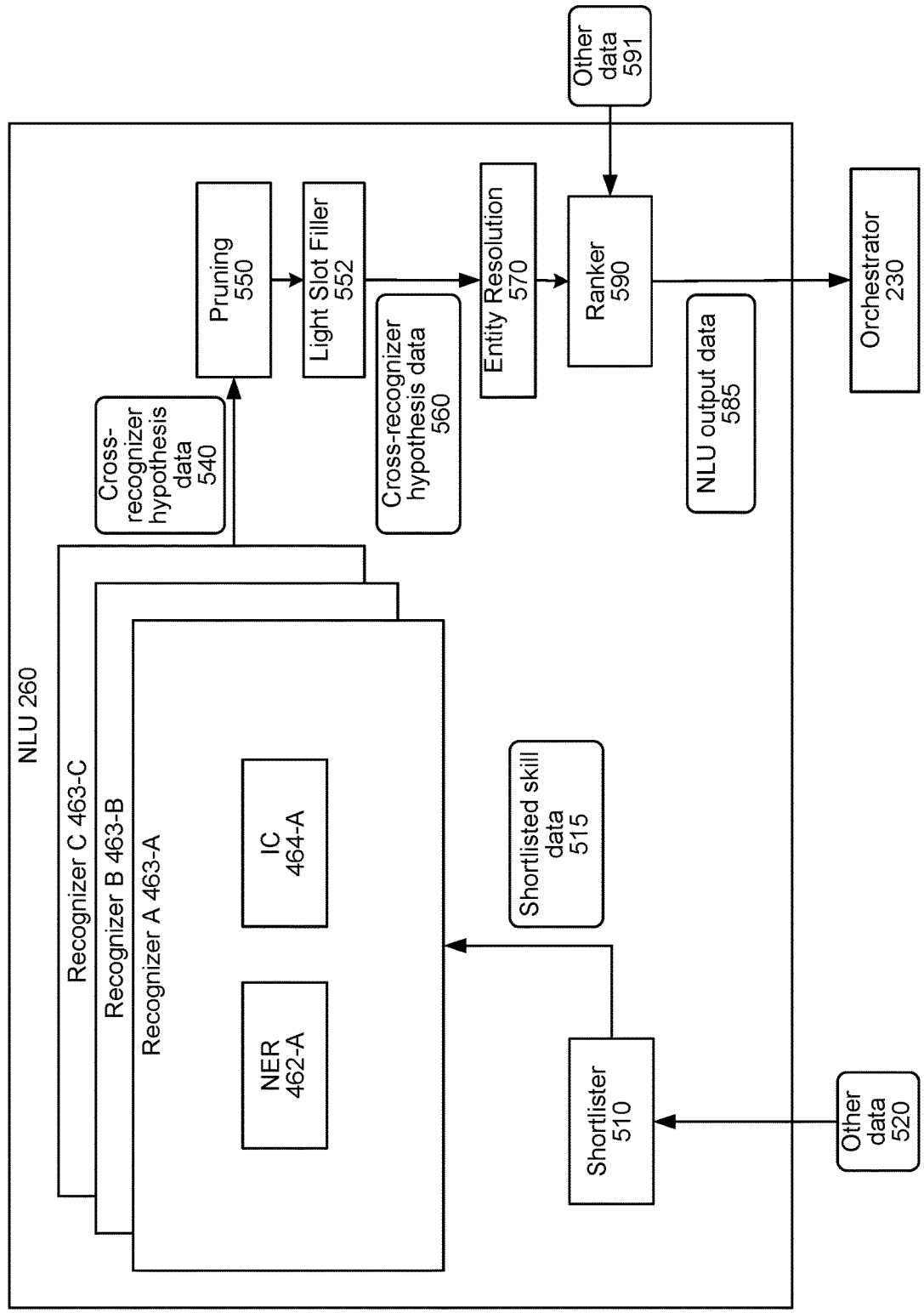
FIG. 5 is a conceptual diagram of how NLU processing may be performed, according to embodiments of the present disclosure.

As illustrated in FIG. 5, the NLU component 260 may include a shortlister component 510. The shortlister component 510 selects skills 225 that may execute in response to the natural language input. The shortlister component 510 thus limits downstream, more resource intensive NLU processes to being performed with respect to skills 225 that are likely to execute in response to the natural language input.

Without a shortlister component 510, the NLU component 260 may process a given ASR hypothesis (or the text data 213 depending on the type of natural language input being processed) with respect to every skill 225 of (or in communication with) the system 120, either in parallel, in series, or using some combination thereof. By implementing a shortlister component 510, the NLU component 260 may process a given ASR hypothesis (or the text data 213) with respect to only the skills 225 that are likely to execute in response to the natural language input. This reduces total compute power and latency attributed to NLU processing.

The shortlister component 510 may include one or more machine learning (ML) models. The ML model(s) may be trained to recognize various forms of natural language inputs that may be received by the system 120. For example, during a training period a developer of a skill 225 may provide the system 120 with training data representing sample natural language inputs that may be processed by the skill 225. For example, a developer of a ride sharing skill may provide the system 120 with training data corresponding to "get me a cab to [location]," "get me a ride to [location]," "book me a cab to [location]," "book me a ride to [location]," etc. The one or more ML models may be trained using the training data to determine other potentially related natural language input structures that may be processed by the skill 225. During training, the system 120 may query the skill 225 regarding whether the determined other natural language input structures are capable of being processed by the skill 225 at runtime. The alternate natural language input structures may be derived by one or more ML models during model training and/or may be based on natural language input structures provided by different skills 225. A developer of a skill 225 may also provide the system 120 with training data indicating grammar and annotations.

The system 120 may use the training data representing the sample natural language inputs, the determined related natural language input(s), and the grammar and annotations to train a ML model(s) that indicates when a runtime natural language input is likely to be processed by a particular skill 225. In some embodiments, each ML model of the shortlister component 510 may be trained with respect to a different skill 225. In some other embodiments, the shortlister component 510 may implement one ML model per skill type, such as one ML model for weather skills, one ML model for ride sharing skills, etc.

The system 120 may use the sample natural language inputs provided by a developer of a skill 225, and related sample natural language inputs determined during training, as binary examples to train a ML model associated with the skill 225. The ML model, associated with the skill 225, may then be operated at runtime by the shortlister component 510. Some sample natural language inputs may be positive training examples (e.g., natural language inputs that may be processed by the skill 225), whereas other sample natural language inputs may be negative training examples (e.g., natural language inputs that may not be processed by the skill 225).

As described above, the shortlister component 510 may include a different ML model for each skill 225, a different ML model for each skill type, or some other combination of ML models. For example, the shortlister component 510 may alternatively include a single ML model that includes a portion trained with respect to characteristics (e.g., semantic characteristics) shared by all skills 225, and also include skill-specific portions, with each skill-specific portion being trained with respect to a different skill 225. Implementing a single ML model with skill-specific portions may result in less latency than implementing a different ML model for each skill 225 because the single ML model with skill-specific portions limits the number of characteristics processed on a per skill level.

The portion of the ML model, trained with respect to characteristics shared by more than one skill 225, may be clustered based on skill type. For example, a first portion, of the portion trained with respect to multiple skills 225, may be trained with respect to weather skills; a second portion, of the portion trained with respect to multiple skills 225, may be trained with respect to music skills; a third portion, of the portion trained with respect to multiple skills 225, may be trained with respect to travel skills; etc.

Clustering may not be beneficial in every instance because clustering may cause the shortlister component 510 to output indications of only a portion of the skills 225 that the natural language input may relate to. For example, a natural language input may correspond to "tell me about Tom Collins." If the ML model is clustered based on skill type, the shortlister component 510 may determine the natural language input corresponds to a recipe skill (e.g., storing or otherwise having access to a drink recipe) even though the natural language input may also correspond to an information skill (e.g., storing or otherwise having access to information about a person named Tom Collins).

Training the ML model(s) of the shortlister component 510 may require establishing a "ground truth" for the training examples input therein. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The ML model(s) of the shortlister component 510 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

If the shortlister component 510 determines a natural language input is associated with multiple skills 225, only the recognizers 463 associated with those skills 225 may process with respect to the natural language input. The selected recognizers 463 may process in parallel, in series, partially in parallel, etc. For example, if the shortlister component 510 determines a natural language input may relate to both a communications skill and a music skill, a recognizer associated with the communications skill may process in parallel, partially in parallel, or in series with a recognizer associated with the music skill.

The shortlister component 510 may make a binary (e.g., yes/no) determination regarding whether a skill 225 corresponds to a natural language input. The shortlister component 510 may make such determination using the one or more ML models described herein above. If the shortlister component 510 implements a single ML model for each skill 225, the shortlister component 510 may simply run the ML models that are associated with enabled skills 225 as indicated in a profile (e.g., stored in profile storage 270) associated with the device 110 and/or user 5.

The shortlister component 510 may generate shortlisted skill data 515 representing one or more skills 225 that may process the natural language input. The number of skills 225 represented in the shortlisted skill data 515 is configurable. In an example, the shortlisted skill data 515 may indicate every skill 225 of (or otherwise in communication with) the system 120 as well as contain an indication, for each skill 225, representing whether the skill 225 is likely capable of processing the natural language input. In another example, instead of indicating every skill 225, the shortlisted skill data 515 may only indicate the skills 225 that are likely capable of processing the natural language input. In yet another example, the shortlister component 510 may implement thresholding such that the shortlisted skill data 515 may indicate no more than a maximum number of skills 225 that may process the natural language input.

In at least some embodiments, the shortlister component 510 may generate a score representing how likely a skill 225 is to process a natural language input. In such embodiments, the shortlisted skill data 515 may only include identifiers of skills 225 associated with scores meeting or exceeding a threshold score.

In the situation where the ASR component 250 generates ASR output data including more than one ASR hypothesis, the shortlister component 510 may output different shortlisted skill data 515 for each ASR hypothesis. Alternatively, the shortlister component 510 may output a single instance of shortlisted skill data 515 representing the skills 225 corresponding to the different ASR hypotheses.

As indicated above, the shortlister component 510 may implement thresholding such that the shortlisted skill data 515 may indicate no more than a threshold number of skills 225 (e.g., may include no more than a threshold number of skill identifiers). If the ASR component 250 generates ASR output data including more than one ASR hypothesis, the shortlisted skill data 515 may indicate no more than a threshold number of skills 225 irrespective of the number of ASR hypotheses generated by the ASR component 250. Alternatively or in addition, the shortlisted skill data 515 may indicate no more than a threshold number of skills 225 for each ASR hypothesis (e.g., indicating no more than five skills 225 for a first ASR hypothesis, no more than five skills 225 for a second ASR hypothesis, etc.).

In addition to making a binary determination regarding whether a skill 225 may process a natural language input, the shortlister component 510 may generate scores representing likelihoods that skills 225 may process the natural language input. If the shortlister component 510 implements a different ML model for each skill 225, the shortlister component 510 may generate a different confidence score for each skill-specific ML model that is run by the shortlister component 510. For example, if the shortlister component 510 runs the ML models of every skill 225 of (or otherwise in communication with) the system 120, the shortlister component 510 may generate a respective confidence score for each skill 225. For further example, if the shortlister component 510 only runs ML models specific to skills 225 that are indicated as enabled in a profile associated with the device 110 and/or user 5 (as stored in profile storage 270), the shortlister component 510 may only generate a respective confidence score for each enabled skill 225. For further example, if the shortlister component 510 implements a single ML model with skill-specific portions, the shortlister component 510 may generate a respective confidence score for each skill 225 who's specifically trained portion is run. The shortlister component 510 may perform matrix vector modification to obtain confidence scores for skills 225.

An example of shortlisted skill data 515 including confidence scores may be represented as:
Search skill, 0.67
Recipe skill, 0.62
Information skill, 0.57

As indicated, the confidence scores output by the shortlister component 510 may be numeric values. The confidence scores output by the shortlister component 510 may alternatively be binned values (e.g., high, medium, low).

The shortlister component 510 may consider other data 520 when determining which skills 225 may process a natural language input. The other data 520 may be character embedded (or embedded using other techniques) prior to being input to the shortlister component 510.

The other data 520 may include usage history data associated with the device 110 and/or user 5. For example, a confidence score of a skill 225 may be increased if natural language inputs received by the device 110 and/or originating from the user 5 routinely relate to the skill 225. Conversely, a confidence score of a skill 225 may be decreased if natural language inputs received by the device 110 and/or originated from the user 5 rarely relate to the skill 225.

The other data 520 may indicate the skills 225 that are enabled with respect to the device 110 and/or user 5 (e.g., as represented in profile storage 270). The shortlister component 510 may use such data to determine which skill-specific ML models to run. That is, the shortlister component 510 may determine to only run the ML models associated with enabled skills 225. The shortlister component 510 may alternatively use such data to alter skill confidence scores represented in the shortlisted skill data 515. As an example, considering two skills, one enabled and another unenabled, the shortlister component 510 may run a first ML model (or ML model portion) specific to the unenabled skill as well as a second ML model (or ML model portion) specific to the enabled skill. The shortlister component 510 may initially determine a confidence score of 0.60 for each of the unenabled skill and the enabled skill. The shortlister component 510 may then alter those confidence scores based on whether the skill is enabled. For example, the shortlister component 510 may increase the confidence score associated with the enabled skill and/or decrease the confidence score associated with the unenabled skill.

The user 5 may provide the system 120 with indications of which skills 225 are enabled (e.g., authorized to execute using data associated with the user 5). Such indications may be stored in profile storage 270. The shortlister component 510 may determine whether profile data associated with the user 5 and/or device 110 includes indications of enabled skills 225.

The other data 520 may indicate a device type of the device 110. The device type may indicate the input/output capabilities of the device 110. For example, the device 110 may include a display, may be headless (e.g., displayless), may be mobile or stationary, may include audio playback capabilities, may include a camera, etc. The shortlister component 510 may use such other data 520 to determine which skill-specific ML models (or ML model portions) to run. For example, if the device 110 is displayless, the shortlister component 510 may determine not to run ML models (or ML model portions) specific to skills 225 that output video data. The shortlister component 510 may alternatively use such other data 520 to alter skill confidence scores represented in the shortlisted skill data 515. As an example, considering two skills, one that outputs audio data and another that outputs video data, the shortlister component 510 may run a first ML model (or portion of a ML model) specific to the skill that generates audio data as well as a second ML model (or portion of a ML model) specific to the skill that generates video data. The shortlister component 510 may initially determine a confidence score of 0.60 for each of the skills. The shortlister component 510 may then alter the original confidence scores based on the device type of the device 110. For example, if the device 110 is displayless, the shortlister component 510 may increase the confidence score associated with the skill that generates audio data and/or decrease the confidence score associated with the skill that generates video data.

The device type represented in the other data 520 may represent output capabilities of a device 110 to be used to output content to the user 5, which may not necessarily be the device 110 that received the natural language input. For example, a displayless device may receive the natural language input "play [show title]". The system 120 may determine a smart TV, or other device including or otherwise associated with a display, is to be used to output multimedia content (e.g., audio and video) corresponding to the show.

The other data 520 may include data indicating a speed of the device 110, a location of the device 110, and/or other mobility information. For example, the device 110 may be a vehicle including a display. If the vehicle is moving, the shortlister component 510 may decrease the confidence score associated with a skill 225 that generates video data as it may be undesirable to output video content to the user 5 while in a moving vehicle. The vehicle may output data to the system 120 indicating when the vehicle is in motion.

The other data 520 may include data indicating an in focus skill 225 (e.g., a skill 225 that was processing to output content to the user 5 when the device 110 received the natural language input). For example, the user 5 may speak a first (e.g., a previous) natural language input causing the system 120 to execute a music skill to output music to the user 5. As the music is being output to the user 5, the system 120 may receive a second (e.g., a present) natural language input. The shortlister component 510 may use such other data 520 to alter confidence scores represented in the shortlisted skill data 515. For example, the shortlister component 510 may run a first ML model (or ML model portion) specific to a first skill as well as a second ML model (or ML model portion) specific to a second skill. The shortlister component 510 may initially determine a confidence score of 0.60 for each of the first and second skills. The shortlister component 510 may alter the original confidence scores based on the first skill being in focus (i.e., outputting content when the present natural language input was received). Based on the first skill being in focus, the shortlister component 510 may increase the confidence score associated with the first skill and/or decrease the confidence score associated with the second skill.

The thresholding implemented with respect to the shortlisted skill data 515 and the different types of other data 520 considered by the shortlister component 510 are configurable. For example, the shortlister component 510 may update confidence scores as more other data 520 is considered.

The shortlister component 510 may cause the NLU component 260 to execute only a subset of the recognizers 463 associated with skills 225 represented in the shortlisted skill data 515 as being likely to process the natural language input. If the shortlister component 510 generates the shortlisted skill data 515 to include confidence scores, the shortlister component 510 may cause the NLU component 260 to execute only recognizers 463 associated with skills 225 associated with confidence scores satisfying (e.g., meeting or exceeding) a condition (e.g., a threshold confidence score).

The NLU component 260 may compile NLU hypotheses, output by multiple recognizers 463, into cross-recognizer hypothesis data 540 (illustrated in FIG. 5). Each NLU hypothesis may be associated with a respective score indicating a likelihood that the NLU hypothesis corresponds to a domain, one or more skills 225, etc. associated with the recognizer 463 from which the NLU hypothesis was output. For example, the cross-recognizer hypothesis data 540 may be represented as, with each line corresponding to a different NLU hypothesis:

[0.95] Intent: <PlayMusic> AlbumName: GameOfThrones

[0.70] Intent: <PlayVideo> VideoTitle: GameOfThrones

[0.47] Intent: <PlayVideo>

While the foregoing illustrates the cross-recognizer hypothesis data 540 as including three NLU hypotheses, it will be appreciated that the cross-recognizer hypothesis data 540 may include different numbers of NLU hypotheses with departing from the present disclosure.

The NLU component 260 may send the cross-recognizer hypothesis data 540 to a pruning component 550, which sorts the NLU hypotheses, represented in the cross-recognizer hypothesis data 540, according to their respective scores. The pruning component 550 may then perform score thresholding with respect to the cross-recognizer hypothesis data 540. For example, the pruning component 550 may select NLU hypotheses, represented in the cross-recognizer hypothesis data 540, associated with scores satisfying (e.g., meeting and/or exceeding) a condition (e.g., a threshold score). The pruning component 550 may additionally or alternatively perform number of NLU hypothesis thresholding. For example, the pruning component 550 may select a threshold number of top-scoring NLU hypotheses represented in the cross-recognizer hypothesis data 540.

The pruning component 550 may generate cross-recognizer hypothesis data 560 including the selected NLU hypotheses. The purpose of the pruning component 550 is to create a reduced list of NLU hypotheses so that downstream, more resource intensive, processes may only operate on NLU hypotheses that most likely represent the natural language input.

The NLU component 260 may include a light slot filler component 552 that takes data, represented in the NLU hypotheses output by the pruning component 550, and alters it to make the data more easily processed by downstream components. The light slot filler component 552 may perform low latency operations that do not involve heavy operations such as reference to a knowledge base. The purpose of the light slot filler component 552 is to replace words with other words or values that may be more easily understood by downstream components. For example, if a NLU hypothesis includes the word "tomorrow," the light slot filler component 552 may replace the word "tomorrow" with an actual date for purposes of downstream processing. Similarly, the light slot filler component 552 may replace the word "CD" with "album" or "compact disc." The replaced data is then included in the cross-recognizer hypothesis data 560.

The cross-recognizer hypothesis data 560 may be sent to an entity resolution component 570. The entity resolution component 570 can apply rules or other instructions to standardize labels or tokens in the NLU hypotheses represented in the cross-recognizer hypothesis data 560. The precise transformation may depend on the skill 225, domain, etc. to which a NLU hypothesis relates. For example, for a travel skill-specific NLU hypothesis, the entity resolution component 570 may transform data corresponding to "Boston airport" to the standard "BOS" three-letter code referring to the airport. The entity resolution component 570 can refer to a knowledge base that is used to specifically identify the precise entity referred to in each slot of each NLU hypothesis represented in the cross-recognizer hypothesis data 560.

Specific intent/entity combinations may also be tied to a particular source, which may then be used to resolve the data. Referring to the example natural language input "play songs by the stones," the entity resolution component 570 may reference a personal music catalog, a user profile (for example stored in profile storage 270), or the like. The entity resolution component 570 may output NLU hypotheses, altered from the cross-recognizer hypothesis data 560, that include more detailed information (e.g., entity identifiers) about the specific entities mentioned in the slots and/or more detailed slot data that can eventually be used by a skill 225 to perform an action responsive to the natural language input. The NLU component 260 may include multiple entity resolution components 570 that are each specific to one or more different skills 225, domains, etc.

The NLU component 260 may include a ranker component 590 that assigns a particular score to each NLU hypothesis output by the entity resolution component 570. The ranker component 590 may alter the score of a particular NLU hypothesis based on whether the NLU hypothesis has unfilled slots. For example, if a first NLU hypothesis includes slots that are all filled/resolved, the ranker component 590 may assign the first NLU hypothesis a higher score than a second NLU hypothesis including at least one slot that is unfilled/unresolved by the entity resolution component 570.

The ranker component 590 may apply re-scoring, biasing, or other techniques. To do so, the ranker component 590 may consider not only the data output by the entity resolution component 570, but may also other data 591. The other data 591 may include a variety of data.

The other data 591 may indicate a skill 225 rating or popularity. For example, if a skill 225 has a high rating, the ranker component 590 may increase the score of a NLU hypothesis associated with that skill 225, and vice versa.

The other data 591 may indicate skills 225 that have been enabled by the user 5. For example, the ranker component 590 may assign higher scores to NLU hypotheses associated with enabled skills than NLU hypotheses associated with skills that have not been enabled by the user 5.

The other data 591 may include a system usage history (e.g., specific to the user 5), such as if the user 5 regularly invokes a particular skill 225 or does so at particular times of day.

The other data 591 may indicate a present date, a present time, location of the device 110, weather data, a device type of the device 110, a user identifier of the user 5, as well as other data. For example, the ranker component 590 may consider when any particular skill 225 is currently in focus with respect to the present user 5 and/or device 110 (e.g., music being output by the skill 225 when the present natural language input is received).

The ranker component 590 may output NLU output data 585 including one or more NLU hypotheses. The NLU component 260 may send the NLU output data 285 to the orchestrator component 230.

As described above, the system 120 may perform speech processing using two different components (e.g., the ASR component 250 and the NLU component 260). In at least some embodiments, the system 120 may implement a spoken language understanding (SLU) component 240 (illustrated in FIG. 2) configured to process audio data 211 to determine NLU output data.

The SLU component 240 may be equivalent to a combination of the ASR component 250 and the NLU component 260. Yet, the SLU component 240 may process audio data 211 and directly determine the NLU output data, without an intermediate step of generating ASR output data. As such, the SLU component 240 may take audio data 211 representing a spoken natural language input and attempt to make a semantic interpretation of the spoken natural language input. That is, the SLU component 240 may determine a meaning associated with the spoken natural language input and then implement that meaning. For example, the SLU component 240 may interpret audio data 211 representing a spoken natural language input in order to derive a desired action. The SLU component 240 may output a most likely NLU hypothesis, or multiple NLU hypotheses associated with respective confidence or other scores (such as probability scores, etc.).

Referring again to FIG. 2, the system 120 may include or otherwise communicate with one or more skills 225. A "skill" may refer to software, that may be placed on a machine or a virtual machine (e.g., software that may be launched in a virtual instance when called), configured to process NLU output data and perform one or more actions in response thereto. For example, for NLU output data including a <PlayMusic> intent, an "artist" entity type, and an artist name as an entity value, a music skill may be called to output music sung by the indicated artist. For further example, for NLU output data including a <TurnOn> intent, a "device" entity type, and an entity value of "lights," a smart home skill may be called to cause one or more "smart" lights to operate in an "on" state. In another example, for NLU output data including an <OutputWeather> intent, a "location" entity type, and an entity value corresponding to a geographic location of the device 110, a weather skill may be called to output weather information for the geographic location. For further example, for NLU output data including a <BookRide> intent, a taxi skill may be called to book a requested ride. In another example, for NLU output data including a <BuyPizza> intent, a restaurant skill may be called to place an order for a pizza. What is described herein as a skill 225 may be referred to using different terms, such as a processing component, an action, bot, application, or the like.

A skill 225 may operate in conjunction between the system 120 and other devices, such as the device 110, restaurant electronic ordering systems, taxi electronic booking systems, etc. in order to complete certain functions. Inputs to a skill 225 may come from speech processing interactions or through other interactions or input sources.

A skill 225 may be associated with a domain, a non-limiting list of which includes a smart home domain, a music domain, a video domain, a weather domain, a communications domain, a flash briefing domain, a shopping domain, and a custom domain.

The system 120 may include a TTS component 280 that generates audio data including synthesized speech. The data input to the TTS component 280 may come from a skill 225, the orchestrator component 230, or another component of the system 120.

In one method of synthesis called unit selection, the TTS component 280 matches input data against a database of recorded speech. The TTS component 280 selects matching units of recorded speech and concatenates the units together to form audio data. In another method of synthesis called parametric synthesis, the TTS component 280 varies parameters such as frequency, volume, and noise to determine audio data including an artificial speech waveform. Parametric synthesis uses a computerized voice generator, sometimes called a vocoder.

The system 120 may include a user recognition component 295. The user recognition component 295 may recognize one or more users using various data. The user recognition component 295 may take as input the audio data 211. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, retina data, etc.), received by the system 120 in correlation with a natural language input, to stored biometric data of users. The user recognition component 295 may additionally or alternatively perform user recognition by comparing image data (e.g., including a representation of at least a feature of a user), received by the system 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that received the natural language input.

The user recognition component 295 determines whether a natural language input originated from a particular user. For example, the user recognition component 295 may determine a first value representing a likelihood that a natural language input originated from a first user, a second value representing a likelihood that the natural language input originated from a second user, etc. The user recognition component 295 may also determine an overall confidence regarding the accuracy of user recognition processing.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill 225, as well as processing performed by other components of the system 120 and/or other systems.

The system 120 may include profile storage 270. The profile storage 270 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; and/or other data.

The profile storage 270 may include one or more user profiles. Each user profile may be associated with a different user identifier. Each user profile may include various user identifying data. Each user profile may also include preferences of the user. Each user profile may include one or more device identifiers, representing one or more devices registered to the user. Each user profile may include skill identifiers of skills 225 that the user has enabled. When a user enables a skill 225, the user is providing the system 120 with permission to allow the skill 225 to execute with respect to the user's natural language inputs. If a user does not enable a skill 225, the system 120 may not execute the skill 225 with respect to the user's natural language inputs.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 270 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

The system 120 may also include a model updating component 720 and input data storage 710, which are described in detail herein below with respect to FIG. 7.

Figure 6:
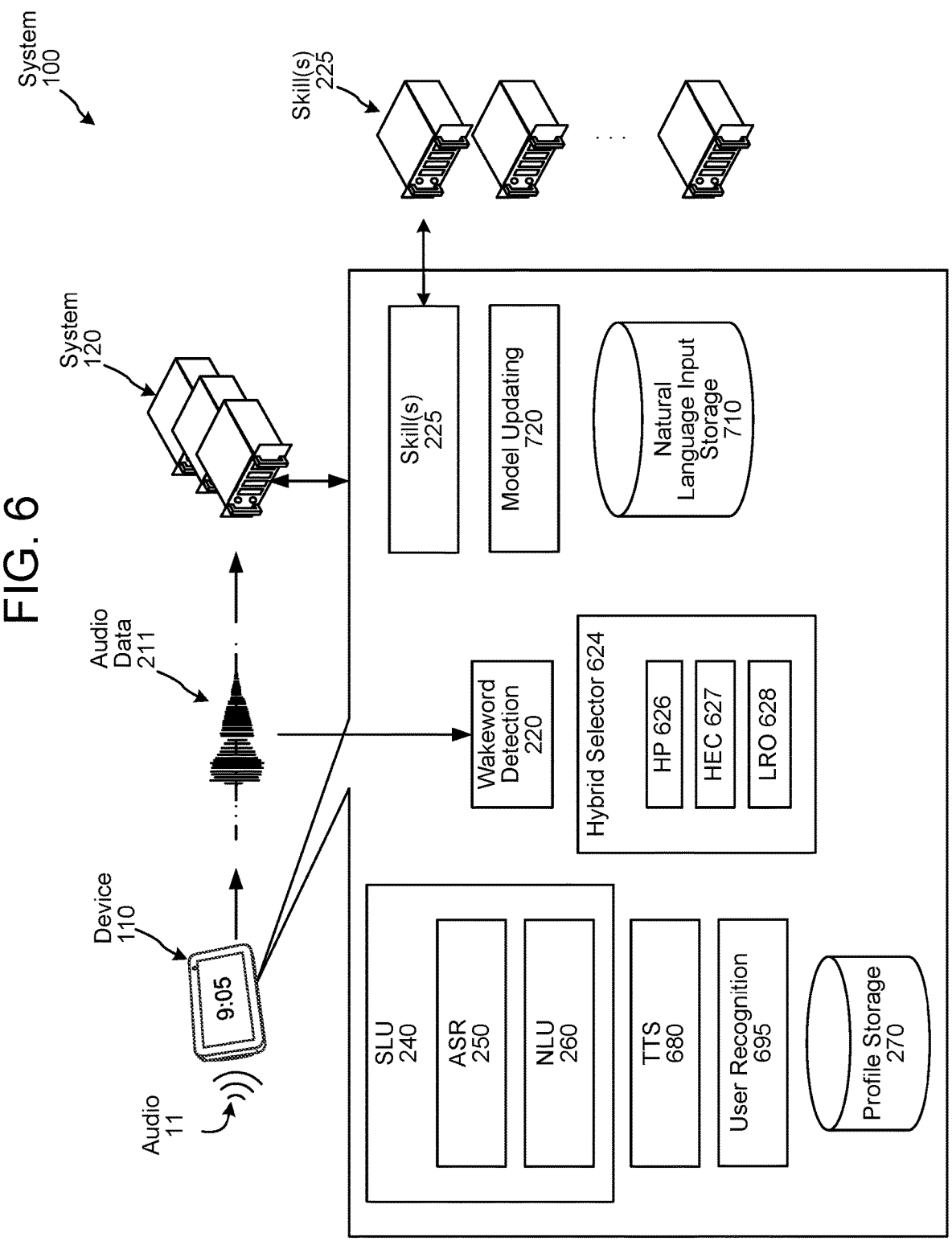
FIG. 6 is a conceptual diagram illustrating components that may be included in a device, according to embodiments of the present disclosure.

The foregoing describes illustrative components and processing of the system 120. The following describes illustrative components and processing of the device 110. As illustrated in FIG. 6, in at least some embodiments, the system 120 may receive the audio data 211 from the device 110, to recognize speech corresponding to a spoken natural language in the received audio data 211, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., an audio or video call) between the user 5 and another user, and so on.

As noted with respect to FIG. 2, the device 110 may include a wakeword detection component 220 configured to used to detect a wakeword (e.g., "Alexa") that indicates to the device 110 that the audio data 211 is to be processed for determining NLU output data. In at least some embodiments, a hybrid selector 624, of the device 110, may send the audio data 211 to the wakeword detection component 220. If the wakeword detection component 220 detects a wakeword in the audio data 211, the wakeword detection component 220 may send an indication of such detection to the hybrid selector 624. In response to receiving the indication, the hybrid selector 624 may send the audio data 211 to the system 120 and/or an on-device ASR component 250. The wakeword detection component 220 may also send an indication, to the hybrid selector 624, representing a wakeword was not detected. In response to receiving such an indication, the hybrid selector 624 may refrain from sending the audio data 211 to the system 120, and may prevent the on-device ASR component 250 from processing the audio data 211. In this situation, the audio data 211 can be discarded.

The device 110 may conduct its own speech processing using on-device language processing components (such as an on-device SLU component 240, an on-device ASR component 250, and/or an on-device NLU component 260) similar to the manner discussed above with respect to the speech processing system-implemented SLU component 240, ASR component 250, and NLU component 260. The device 110 may also internally include, or otherwise have access to, other components such as one or more skills 225, a user recognition component 295 (configured to process in a similar manner to the speech processing system-implemented user recognition component 295), profile storage 270 (configured to store similar profile data to the speech processing system-implemented profile storage 270), a context aggregation component 665, a dynamic routing component 675, a model updating component 720, input data storage 710, and other components. In at least some embodiments, the on-device profile storage 270 may only store profile data for a user or group of users specifically associated with the device 110.

In at least some embodiments, the on-device language processing components may not have the same capabilities as the language processing components implemented by the system 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 624, of the device 110, may include a hybrid proxy (HP) 626 configured to proxy traffic to/from the system 120. For example, the HP 626 may be configured to send messages to/from a hybrid execution controller (HEC) 627 of the hybrid selector 624. For example, command/directive data received from the system 120 can be sent to the HEC 627 using the HP 626. The HP 626 may also be configured to allow the audio data 211 to pass to the system 120 while also receiving (e.g., intercepting) this audio data 211 and sending the audio data 211 to the HEC 627.

In at least some embodiments, the hybrid selector 624 may further include a local request orchestrator (LRO) 628 configured to notify the on-device ASR component 250 about the availability of the audio data 211, and to otherwise initiate the operations of on-device language processing when the audio data 211 becomes available. In general, the hybrid selector 624 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 211 is received, the HP 626 may allow the audio data 211 to pass through to the system 120 and the HP 626 may also input the audio data 211 to the on-device ASR component 250 by routing the audio data 211 through the HEC 627 of the hybrid selector 624, whereby the LRO 628 notifies the on-device ASR component 250 of the audio data 211. At this point, the hybrid selector 624 may wait for response data from either or both the system 120 and/or the on-device language processing components. However, the disclosure is not limited thereto, and in some examples the hybrid selector 624 may send the audio data 211 only to the on-device ASR component 250 without departing from the disclosure. For example, the device 110 may process the audio data 211 on-device without sending the audio data 211 to the system 120.

The on-device ASR component 250 is configured to receive the audio data 211 from the hybrid selector 624, and to recognize speech in the audio data 211, and the on-device NLU component 260 is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component 260) may be selected as usable to respond to a natural language input, and local response data may be sent (e.g., local NLU output data, local knowledge base information, internet search results, and/or local directive data) to the hybrid selector 624, such as a "ReadyToExecute" response. The hybrid selector 624 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 5.

The device 110 and/or the system 120 may associate a unique identifier with each natural language input. The device 110 may include the unique identifier when sending the audio data 211 to the system 120, and the response data from the system 120 may include the unique identifier to identify to which natural language input the response data corresponds.

In at least some embodiments, the device 110 may include one or more skills 225 that may process similarly to the speech processing system-implemented skill(s) 225. The skill(s) 225 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

Figure 7:
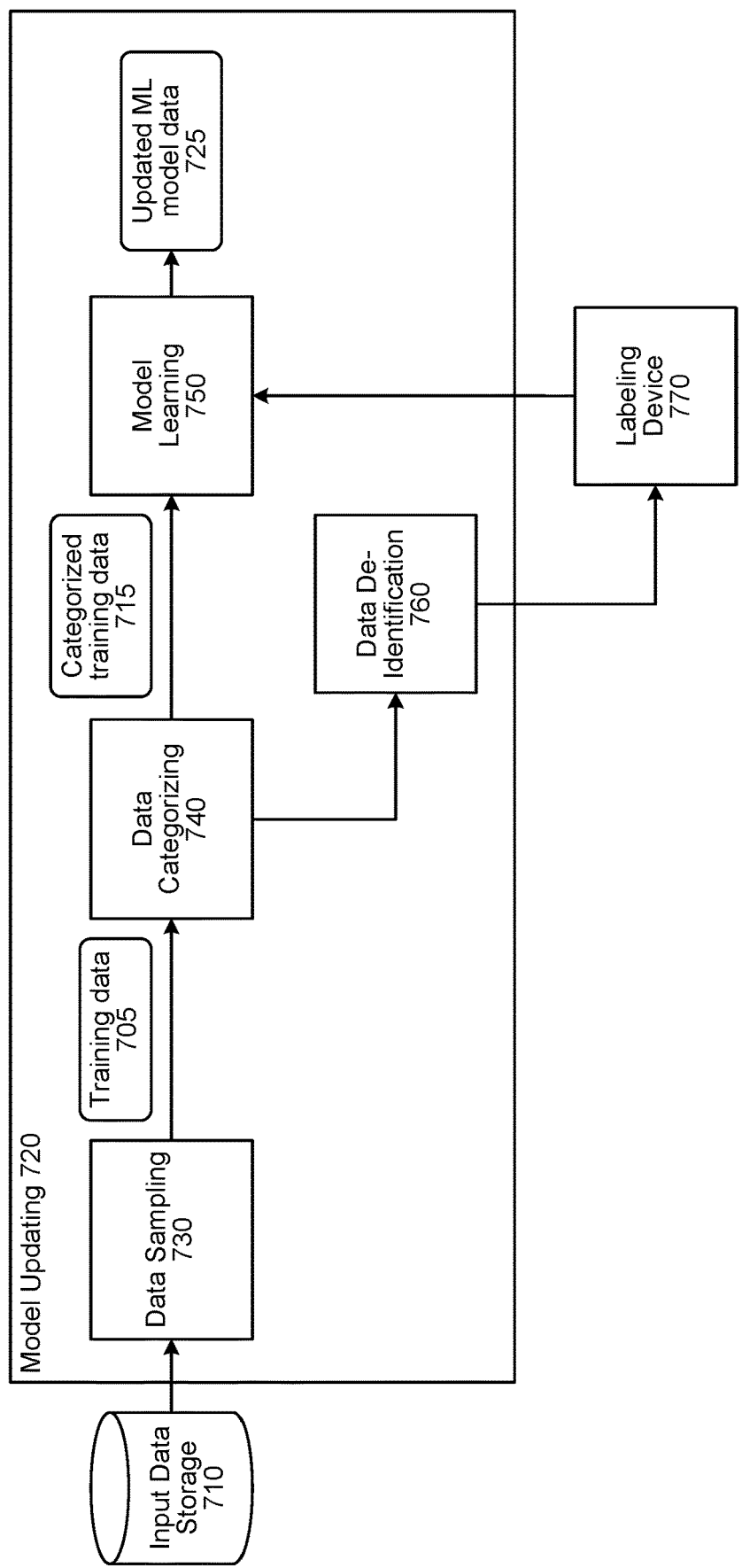
FIG. 7 is a conceptual diagram illustrating a model updating component, according to embodiments of the present disclosure.

Referring now to FIG. 7, the model updating component 720, included in the system 120 or the device 110, is described. The model updating component 720 may communicate with the input data storage 710, and may include a data sampling component 730, a data categorizing component 740, and a model learning component 750.

The input data storage 710 may include data, corresponding to one or more natural language and/or non-natural language inputs, usable to update an already in-production ML model(s) (i.e., an ML model(s) already being implemented at runtime). For example, the data, in the input data storage 710, may be usable to update a language model(s) used to perform ASR processing, an IC model(s) using to perform IC processing, a NER model(s) used to perform NER processing, a DC model(s) used to perform DC processing, a feature extraction model(s) used to perform feature extraction processing (e.g., for user recognition processing, such as facial recognition processing), and/or a gesture detection model(s) used to perform gesture detection processing. However, the present disclosure is not limited thereto, and it will be appreciated that the processing of the model updating component 720 may be implemented by various systems to update various ML models.

The data, stored in the input data storage 710, may depend on the type of ML model(s) being updated. For example, if the ML model(s) being updated is a language model(s), IC model(s), NER model(s), DC model(s), or other natural language input processing model, the input data storage 710 may store audio data corresponding to one or more runtime spoken natural language inputs, ASR output data (e.g., text data, token data, ASR hypotheses with a confidence score, etc.) corresponding to one or more runtime spoken natural language inputs, text data corresponding to one or more runtime textual natural language inputs, or some combination thereof. In embodiments where the input data storage 710 stores ASR output data, the input data storage 710 may store ASR output data associated with an ASR confidence score satisfying (e.g., meeting or exceeding) a condition (e.g., a threshold ASR confidence score), but not store ASR output data associated with an ASR confidence score failing to satisfy the condition. Thus, the input data storage 710 may be configured to only store ASR output data that the system 120/device 110 is confident represents a corresponding natural language input. In some embodiments, the system 120/device 110 may use one or more art-known/industry-known and/or proprietary natural language generation techniques to generate ASR output data corresponding to one or more computer synthesized natural language inputs. For further example, if the ML model(s) being updated is a feature extraction model(s) and/or a gesture detection model(s), the input data storage 710 may store image data corresponding to one or more images captured at runtime.

The system 120/device 110 may be configured to delete data, from the input data storage 710, after the data has been stored for a period of time. For example, the system 120/device 110 may be configured to delete data, from the input data storage 710, after the data has been stored for 24 hours, one week, one month, 3 months, etc. For illustration, if the period of time is 24 hours, the input data storage 710 may only store data corresponding to natural language inputs received in the past 24 hours. Such provides increased user privacy. In some embodiments, the period of time, with respect to which the system 120/device 110 permits data to be stored in the input data storage 710, may correspond to a periodicity of the model updating component 720 updating the ML model(s).

To enable the foregoing deletion of data on a periodic basis, the data, in the input data storage 710, may be associated with a timestamp representing either (i) when the natural language input, to which the data corresponds, was received, or (ii) when the data was stored to the input data storage 710. The system 120/device 110 may determine a length of time between the timestamp and a present time; determine whether the length of time satisfies (e.g., meets or exceeds) a condition (e.g., a threshold length of time); and, if the length of time satisfies the condition, delete the data, associated with the timestamp, from the input data storage 710.

In some embodiments, the system 120/device 110 may permit data to be stored, in the input data storage 710, for longer than the aforementioned period of time. For example, a user may provide the system 120/device 110 with authorization (e.g., in an explicit opt-in manner) to store data, representing the user's natural language inputs, for longer than the period of time. In such instances, the system 120/device 110 may permit data, corresponding to the user's natural language inputs, to be stored for longer than the period of time. To enable such longer duration storage, when the system 120/device 110 receives a natural language input, the system 120/device 110 may use the user recognition component 295 to determine a user identifier representing a user that input the natural language input; determine profile data (e.g., user profile data, group profile data, device profile data, etc.) associated with the user identifier and/or a device identifier of the device 110 that received the natural language input; determine whether the profile data indicates authorization has been provided to store data (representing natural language inputs) for longer than the period of time; and, if the profile data indicates such authorization, the system 120/device 110 may store, in the input data storage 710, data (corresponding to the natural language input)

associated with an indicator (e.g., flag) representing the data can be stored for longer than the period of time.

For further example, the system 120/device 110 may store data, for longer than the period of time, in the input data storage 710 when the system 120/device 110 performs de-identification processing on the data such that user-specific information, in the data, is removed sufficiently to prevent the data from being used to uniquely identify the user. For example, de-identification processing may remove names, phone numbers, social security numbers, addresses, and other user identifying information from data.

In theory, the system 120/device 110 could perform de-identification processing on all data to be stored in the input data storage 710, such that all the data may be stored for longer than the period of time. However, due to processing budgetary constraints and the magnitude of natural language inputs the system 120/device 110 may receive, the system 120/device 110 may selectively perform de-identification processing on only a subset of data. The system 120/device 110 may use various logic for determining which data is to undergo de-identification processing prior to being stored in the input data storage 710.

Figure 8:
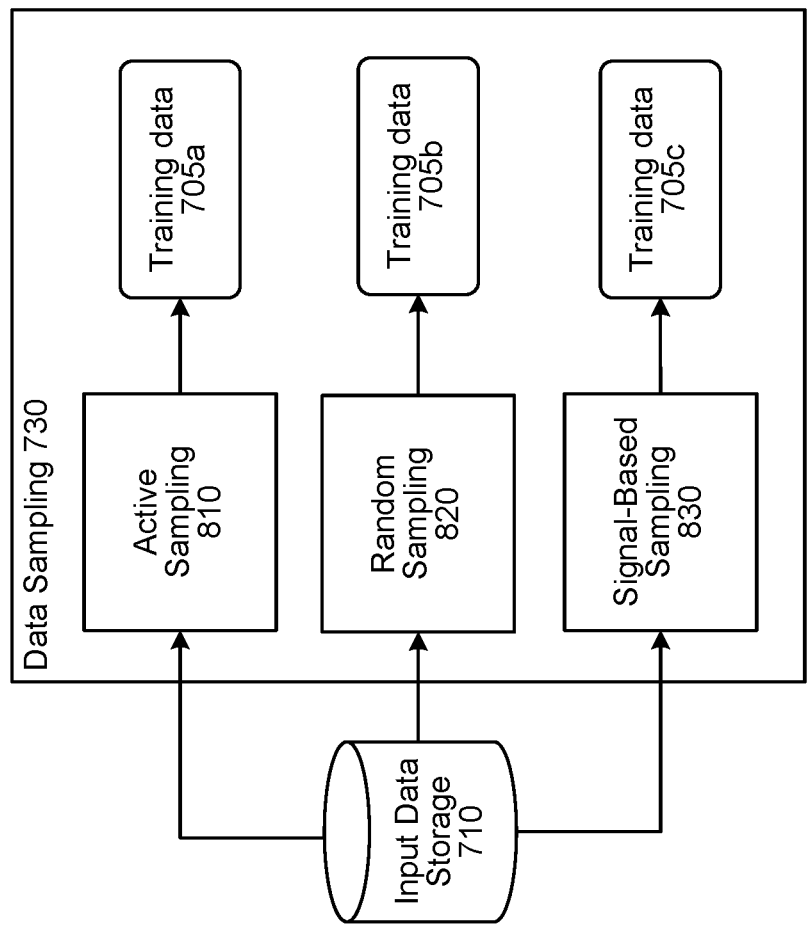
FIG. 8 is a conceptual diagram illustrating a data sampling component of the model updating component, according to embodiments of the present disclosure.

The data sampling component 730, of the model updating component 720, may be configured to retrieve data from the input data storage 710 for the purpose of updating a runtime ML model(s). Generally, the data sampling component 739 may selectively retrieve (i.e., sample) data, from the input data storage 710, so the model updating component 720 can selectively update the runtime ML model(s). In some embodiments, the data sampling component 730 may selectively retrieve data, from the input data storage 710, based on a set of heuristics that maintain data distribution across devices and domains. Details of the data sampling component 730 are illustrated in and described with respect to FIG. 8. As illustrated, the data sampling component 730, in some embodiments, may include an active sampling component 810, a random sampling component 820, and a signal-based sampling component 830. However, it will be appreciated that the present disclosure is not limited thereto, and that the components of the data sampling component 730 are configurable.

The active sampling component 810 may be configured to retrieve data for updating a runtime ML model(s) with respect to a group of natural language inputs the runtime ML model(s) has processed with low success (e.g., with a low confidence, resulted in unresponsive/undesired outputs to the user input, resulted in errors in processing, etc.) since a most recent training/updating. Such low success may be due to the runtime ML model(s) not being trained/updated with respect to a particular user accent, a particular intent, a particular named entity, a particular domain, etc.

For example, the system 120 may implement a runtime ML model with respect to natural language inputs received from users and/or devices corresponding to various geographic locations, and the runtime ML model may not be trained with respect to an accent of users from a particular geographic location, resulting in the ML model performing poorly with respect to natural language inputs from users of the geographic location. Data, in the input data storage 710, may be associated with geographic location information representing a geographic location of the user and/or device that provided/received the corresponding natural language input. Data, in the input data storage 710 may also be associated with a confidence score representing the ML model's confidence of processing the natural language input corresponding to the data. The active sampling component 810 may determine an amount (e.g., a minimum threshold amount) of natural language inputs, corresponding to a particular geographic location, are associated with a score (e.g., an IC confidence score, a NER confidence score, a DC confidence score, a NLU confidence score, etc.) failing to satisfy (e.g., meet or exceed) a condition (e.g., a threshold confidence score). Based thereon, the active sampling component 810 may query the input data storage 710 for data representing natural language inputs received from users and/or devices associated with the geographic location. Such queried data is illustrated as training data 705*a* in FIG. 8.

For further example, the system 120 may implement a runtime ML model that is not trained with respect to a named entity to be recognizable by the system 120/device 110. The active sampling component 810 may query the input data storage 710 for data representing natural language inputs including the named entity. Such queried data is illustrated as training data 705*a* in FIG. 8.

The training data 705*a* may include different data types, depending on the data types stored in the input data storage 710. For example, the training data 705*a* may include audio data corresponding to spoken natural language inputs, ASR output data corresponding to spoken natural language inputs, and/or text data corresponding to textual natural language inputs.

The random sampling component 820, of the data sampling component 730, may be configured to retrieve data for updating a runtime ML model(s) with respect to a group of natural language inputs that may not necessarily be tied to poor ML model(s) performance. The goal of random sampling may be to update the ML model(s) to account for distinctions in how various users of the system say and/or otherwise structure natural language inputs. In some embodiments, the random sampling component 820 may retrieve, from the input data storage 710, data with different proportions of represented natural language inputs corresponding to different geographic locations. For example, the random sampling component 820 may query the input data storage 710 for data with 70% of the natural language inputs corresponding to a first geographic location, and 30% of the natural language input corresponding to a second geographic location. It will be appreciated that the present disclosure is not limited to the foregoing example, and that the data sampling component 730 may retrieve data corresponding to two or more geographic locations and various percentage splits without departing from the present disclosure. Similarly, the random sampling component 820 may retrieve, from the input data storage 710, data with different proportions of represented natural language inputs corresponding to different user genders, different user accents, and/or other user differentiating criteria.

The signal-based sampling component 830, of the data sampling component 730, may retrieve, from the input data storage 710, data corresponding to non-natural language inputs. Such retrieved data may be used to update one or more ML models configured to perform non-natural language processing. For example, the signal-based sampling component 830 may query the input data storage 710 for image data that underwent gesture detection processing using a ML model(s) at runtime. As used herein, "gesture detection processing" refers to computer processing aimed at interpreting bodily motion (e.g., a hand wave, a nod of a head, etc.) of users. For further example, the signal-based sampling component 830 may query the input data storage 710 for image data that underwent facial recognition processing (a type of user recognition processing) using a ML model(s) at runtime or that underwent emotion/sentiment detection processing to identify a user's emotion/sentiment from the image data.

Referring to FIG. 7, the data sampling component 730 outputs training data 705, which may include the training data 705a, the training data 705b, and/or the training data 705c depending on the sampling technique(s) used. The training data 705 may be input to the data categorizing component 740 of the model updating component 720. When input to the data categorizing component 740, the training data 705 may not include labels (annotations) usable to update the runtime ML model(s). For example, if the runtime model being updated is a NLU model(s) (e.g., an IC model(s), a NER model(s), and/or a DC model(s)), the training data 705 may not include intent labels, NER labels, DC labels, or other labels useful in performing NLU processing.

Figure 9:
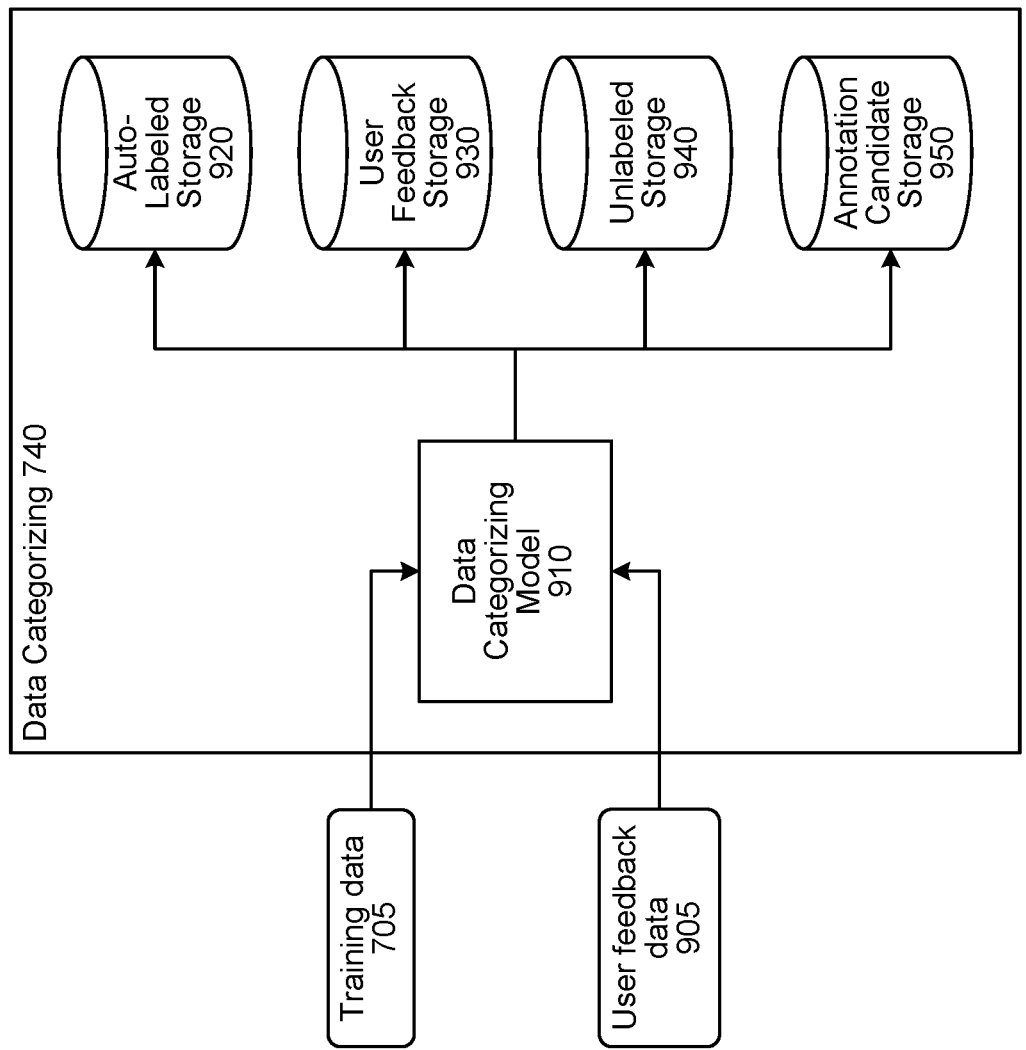
FIG. 9 is a conceptual diagram illustrating a data categorizing component of the model updating component, according to embodiments of the present disclosure.

Example components of the data categorizing component 740 are illustrated in FIG. 9. The data categorizing component 740 may include a data categorizing model 910, an auto-labeled storage 920, a user feedback storage 930, an unlabeled storage 940, and an annotation candidate storage 950.

The data categorizing model 910 may be a trained ML model configured to label the training data 705 and categorize the training data into one or more categories of training data. For example, each storage of the data categorizing component 740 may correspond to a different training data category determinable by the data categorizing model 910.

The data categorizing model 910 may be trained and operated according to various ML techniques. Such techniques may include, for example, neural networks (such as deep neural networks and/or recurrent neural networks), inference engines, trained classifiers, etc. Examples of trained classifiers include SVMs, neural networks, decision trees, AdaBoost combined with decision trees, and random forests. Various techniques may be used to train the data categorizing model 910, including backpropagation, statistical learning, supervised learning, semi-supervised learning, stochastic learning, or other known techniques. In some embodiments, the data categorizing model 910 may be trained using features derived from ASR and NLU models, as well as user feedback information.

The data categorizing model 910 may take as input the training data 705 and user feedback data 905. The training data 705 may correspond to one or more natural language and/or non-natural language inputs. Each user input, represented in the training data 705, may be associated with a user input identifier that uniquely identifies processing and data relating to the specific user input.

The data categorizing component 740 may query a user feedback storage (or other storage implemented by the system 120/device 110 and storing user feedback data) for negative user feedback data associated with the user input identifiers associated with the user inputs represented in the training data 705. The user feedback data 905 may include one or more instances of negative user feedback and/or one or more instances of positive user feedback. An instance of negative user feedback (represented in the user feedback data 905 and associated with a particular user input identifier) may represent a situation where the system 120/device 110 performed an action in response to a user input, the system 120/device 110 output synthesized speech asking the user if the performed action was correct, and the user explicitly responded with a user input indicating the performed action was incorrect. Such negative user feedback may be referred to as "direct negative user feedback." An instance of negative user feedback may alternatively represent a situation where, while the system 120/device 110 is performing an action in response to a user input, the user interrupts the action with another input (e.g., corresponding to a rephrasing of the user input that resulted in the action being performed), or a situation where the system 120/device 110 uses emotion/sentiment detection processing to determine input speech and/or user facial expressions indicate the user is unsatisfied with output data. Such negative user feedback may be referred to as "indirect negative user feedback." An instance of positive user feedback (represented in the user feedback data 905 and associated with a particular user input identifier) may represent a situation where the system 120/device 110 performed an action in response to a user input, the system 120/device 110 output synthesized speech asking the user if the performed action was correct, and the user explicitly responded with a user input indicating the performed action was correct. Such positive user feedback may be referred to as "direct positive user feedback." An instance of positive user feedback may alternatively represent a situation where the system 120/device 110 uses emotion/sentiment detection processing to determine input speech and/or user facial expressions indicate the user is satisfied with output data. An instance of positive user feedback may alternatively represent a situation where the system 120/device 110 outputs output data and does not receive a subsequent user input rephrasing the user input that led to output of the output data. The foregoing two instances of positive user feedback may be referred to as "indirect positive user feedback."

For a portion of the training data 705 corresponding to a single input, the data categorizing model 910 may determine one or more labels. For example, if the portion of the training data 705 is ASR output data or text data representing a natural language input, the data categorizing model 910 may determine an intent label, and optionally one or more entity labels (i.e., identifying one or more entities) and/or a domain label. For further example, if the portion of the training data 705 is image data, the data categorizing model 910 may determine one or more feature labels (e.g., corresponding to one or more facial features used for user recognition processing) and/or one or more gesture labels representing one or more performed gestures represented in the image data.

The data categorizing model 910, for a portion of the training data 705 corresponding to a single input, may also determine a confidence score representing a confidence in the data categorizing model 910 determining the one or more labels for the portion of the training data 705. In some embodiments, the confidence score may be a numeric value. In some other embodiments, the confidence score may be a binned value (e.g., high, medium, low).

The data categorizing component 740 may selectively store portions of the training data 705 in the various storages of the data categorizing component 740. The auto-labeled storage 920 may store training data that the data categorizing model 910 is able to label with sufficient confidence. For example, the data categorizing component 740 may determine a portion of the training data 705 (corresponding to a single natural language or non-natural language input) is associated with a confidence score satisfying (e.g., meeting or exceeding) a threshold confidence score, may determine the portion of the training data 705 is not associated with user feedback data 905, and based thereon store the portion of the training data 705 in the auto-labeled storage 920.

The user feedback storage 930 may store training data corresponding to natural language and non-natural language inputs associated with user feedback data. For example, the data categorizing component 740 may determine a portion of the training data 705 (corresponding to a single natural language or non-natural language input) is associated with user feedback data 905 and, based thereon, store the portion of the training data 705 in the user feedback storage 930. In some instances, the data categorizing component 740 may not store training data in the user feedback storage 930 unless the training data is associated with user feedback data, and the data categorizing model 910 was able to label the training data with a sufficient confidence (e.g., the data categorizing model 910 generated, for the training data, a confidence score satisfying a threshold confidence score).

The unlabeled storage 940 may store training data usable for training a language model. A language model may be a ML model that receives ASR output data (representing spoken natural language inputs) and/or text data (representing textual natural language inputs) and is trained to identify syntax and semantic relationships between words and/or sentences. Example language models are Bidirectional Encoder Representations from Transformers (BERT), Embeddings from Language Models (ELMo), and generative pre-trained transformer (GPT). In some speech processing systems, IC, NER, and DC models may be built on top of a language model.

The unlabeled storage 940 may store training data without any associated labels (e.g., without an intent label, an entity label(s), or a domain label). In some embodiments, training data, corresponding to a single natural language or non-natural language input, may be stored in both the auto-labeled storage 920 and the unlabeled storage 940, with the difference being that the training data is associated with at least one label in the auto-labeled storage 920, but no labels in the unlabeled storage 940. In some embodiments, if the data categorizing component 740 determines training data is capable of being stored in both the auto-labeled storage 920 and the unlabeled storage 940, the data categorizing component 740 may choose to store the training data in the auto-labeled storage 920, but not the unlabeled storage 940. In some embodiments, if the data categorizing component 740 determines training data is capable of being stored in both the auto-labeled storage 920 and the unlabeled storage 940, the data categorizing component 740 may choose to store the training data in the unlabeled storage 940, but not the auto-labeled storage 920. In some embodiments, if the data categorizing model 910 is able to label an input with a sufficiently high confidence (e.g., a confidence score satisfying at threshold confidence score), then the data categorizing component 740 may store the input in the auto-labeled storage 920 and not the unlabeled storage 940. In other words, in some embodiments the data categorizing component 740 may only store an input in the unlabeled storage 940 if the data categorizing model 910 is unable to label the input with at least a threshold confidence.

The annotation candidate storage 950 may store training data that is to be manually annotated. For example, the data categorizing model 910 may generate, for a portion of the training data 705 corresponding to a single natural language or non-natural language input, a confidence score representing a confidence of the data categorizing model 910 in determining one or more labels for the portion of the training data 705. The data categorizing component 740 may determine the confidence score fails to satisfy (e.g., fails to meet or exceed) a threshold confidence score. Based thereon, the data categorizing component 740 may store the portion of the training data 705 in the annotation candidate storage 950 without any associated labels. For further example, the data categorizing component 740 may determine a portion of the training data 705 (corresponding to a single natural language or non-natural language input) is associated with a user identifier, and may determine the user identifier is associated with user profile data indicating authorization has been provided to store data for an extended period of time for the purpose of training a ML model(s). Based on the user profile data indicating the authorization, the data categorizing component 740 may store the portion of the training data 705 in the annotation candidate storage 950.

Figure 10:
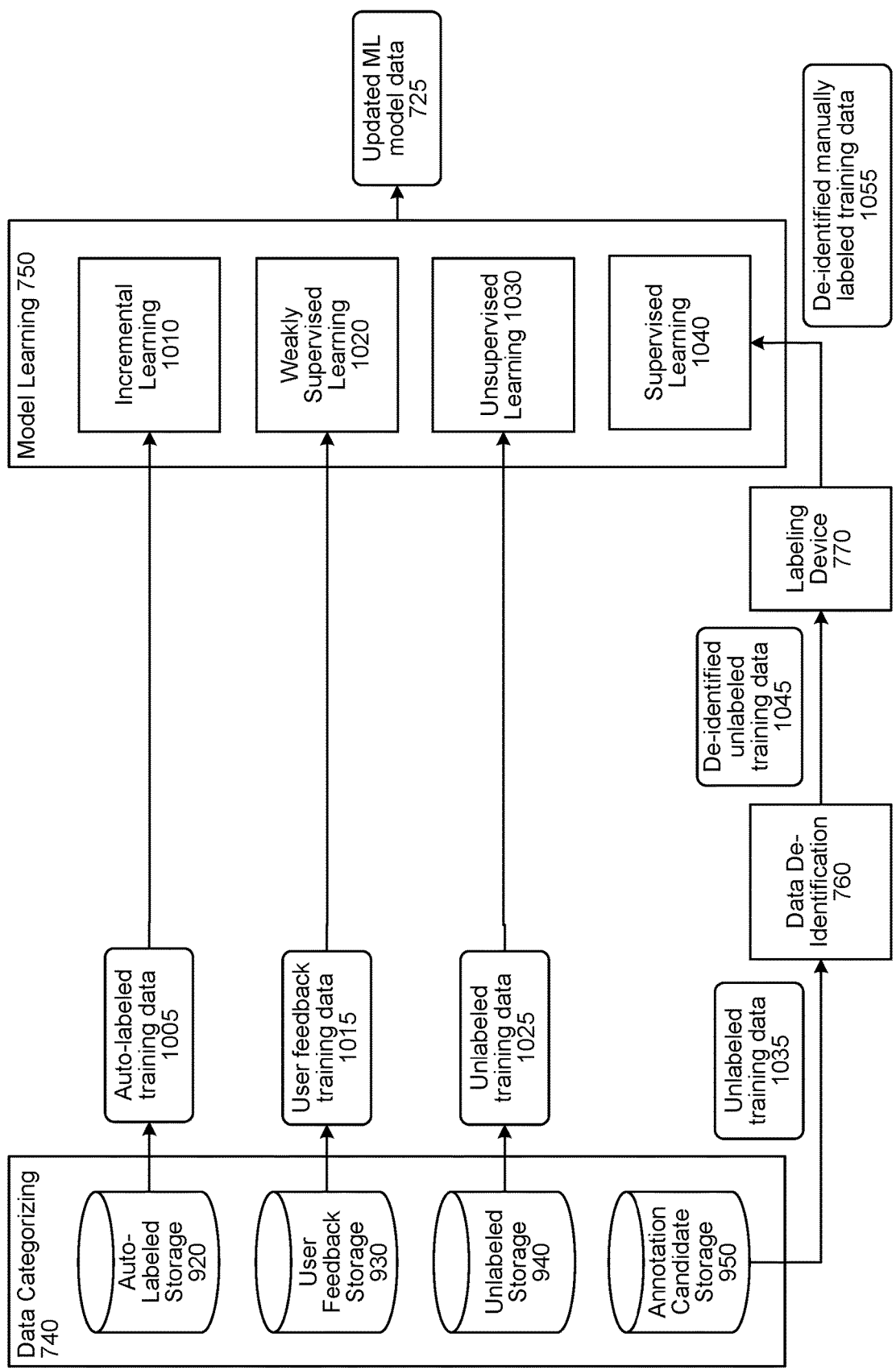
FIG. 10 is a conceptual diagram illustrating processing of a model learning component of the model updating component, according to embodiments of the present disclosure.

One or more model training techniques may be executed to perform a single update to the runtime ML model(s). The one or more model training techniques performed may depend on the training data stored in the one or more storages of the data categorizing component 740 since a most recent update to the ML model(s) was performed. Such is illustrated in FIG. 10. As illustrated in FIG. 10, the model learning component 750 may include an incremental learning component 1010, a weakly supervised learning component 1020, an unsupervised learning component 1030, and a supervised learning component 1040.

The incremental learning component 1010 may perform unsupervised learning using auto-labeled training data 1005, stored in the auto-labeled storage 920 of the data categorizing component 740, and the corresponding input data. For example, if an ASR model is being updated, the incremental learning component 1010 may perform unsupervised learning using audio data of a spoken natural language input and its corresponding ASR output. For further example, if a NER model is being updated, the incremental learning component 1010 may perform unsupervised learning using ASR output data and its corresponding entity type(s) and value(s). In another example, if an IC model is being updated, the incremental learning component 1010 may perform unsupervised learning using ASR output data and its corresponding intent indicator.

In performing incremental learning, the output variables are not manually defined for learning. Rather, the incremental learning component 1010 is configured to pre-process the auto-labeled training data 1005 as needed, and determine a structure or distribution of the auto-labeled training data 1005. In some embodiments, the incremental learning component 1010 may be configured to update the runtime ML model(s) without overwriting parameters, weights, or other data that were previously learned by (and included in the model data of) the runtime ML model(s).

The incremental learning component 1010 may implement one or more art-known and/or industry-known learning techniques, and/or one or more proprietary learning techniques. Example art-known/industry-known learning techniques include k-Means for clustering problems, apriori algorithm for association rule learning problems, Principal Component Analysis, SVD, Independent Component Analysis, Kernel Density Estimation, Manifold Regularization, Gradient Episodic Memory, and Dynamic Expandable Networks.

The weakly supervised learning component 1020 may perform weakly supervised learning (for example, using partially labeled/annotated data) using user feedback training data 1015 stored in the user feedback storage 930 of the data categorizing component 740. For example, the weakly supervised learning component 1020 may determine a name entity label is associated with at least a threshold number of natural language inputs associated with negative user feedback in the user feedback training data 1015. Based on this, the weakly supervised learning component 1020 (or via inputs received from a labeling device 770, such as a desktop computer, laptop computer, smart phone, or tablet computer) may downgrade predictions (or otherwise constrain the training routine) of the runtime ML model(s) so the runtime ML model(s) places less emphasis on the output that resulted from runtime processing of the natural language inputs associated with the negative user feedback in the user feedback training data 1015. This could include the weakly supervised learning component 1020 (or the inputs received from the labeling device 770) up-weighting and/or down-weighting training samples, or constraining the objective of the runtime ML model(s) itself.

For example, the system 120/device 110 may determine the natural language input "play [named entity]" corresponds to either a request to play a book having a title including the named entity or a movie having a title including the named entity. The weakly supervised learning component 1020 (or the human using the labeling device 770) may determine that a higher proportion of the natural language inputs (associated with negative user feedback in the user feedback training data 1015) including the named entity (i.e., associated with the named entity label) are associated with a <PlayBook> intent label. Based on the natural language inputs being associated with negative user feedback data, the weakly supervised learning component 1020 (or the inputs received via the labeling device 770) may down-sample/down-weight <PlayBook> training samples and/or up-sample/up-weight <PlayMovie> training samples corresponding to the named entity. Such re-trains the runtime ML model(s) to favor natural language input interpretations users desire. In some embodiments, training samples may only be up- or down-sampled/weighted a predefined value in a single instance of model learning.

For further example, the weakly supervised learning component 1020 may determine a name entity label is associated with at least a threshold number of natural language inputs associated with positive user feedback in the user feedback training data 1015. Based on this, the weakly supervised learning component 1020 (or via inputs received from a labeling device 770, such as a desktop computer, laptop computer, smart phone, or tablet computer) may upgrade predictions (or otherwise constrain the training routine) of the runtime ML model(s) so the runtime ML model(s) places more emphasis on the output that resulted from runtime processing of the natural language inputs associated with the positive user feedback in the user feedback training data 1015. This could include the weakly supervised learning component 1020 (or the inputs received from the labeling device 770) up-weighting and/or down-weighting training samples, or constraining the objective of the runtime ML model(s) itself.

For example, the system 120/device 110 may determine the natural language input "play [named entity]" corresponds to either a request to play a book having a title including the named entity or a movie having a title including the named entity. The weakly supervised learning component 1020 (or the human using the labeling device 770) may determine that a higher proportion of the natural language inputs (associated with positive user feedback in the user feedback training data 1015) including the named entity (i.e., associated with the named entity label) are associated with a <PlayMovie> intent label. Based on the natural language inputs being associated with positive user feedback data, the weakly supervised learning component 1020 (or the inputs received via the labeling device 770) may up-sample/up-weight <PlayMovie> training samples and/or down-sample/down-weight <PlayBook> training samples corresponding to the named entity. Such re-trains the runtime ML model(s) to favor natural language input interpretations users desire. In some embodiments, training samples may only be up- or down-sampled/weighted a predefined value in a single instance of model learning.

The unsupervised learning component 1030 may perform unsupervised learning using unlabeled training data 1025 stored in the unlabeled storage 940 of the data categorizing component 740. In performing unsupervised learning, the unsupervised learning component 1030 may learn connections, relationships, and other information on its own (without any manual annotations) from the unlabeled training data 1025. For example, the unsupervised learning component 1030 may be configured to learn syntax and semantic relationships between words and sentences represented in the unlabeled training data 1025, when the unlabeled training data 1025 includes examples of natural language inputs, for the purpose of updating one or more language models or other ML models described herein. The unsupervised learning component 1030 may implement one or more art-known and/or industry-known unsupervised learning algorithms, and/or one or more proprietary unsupervised learning algorithms.

Unlabeled training data 1035, stored in the annotation candidate storage 950, may be input to a data de-identification component 760. The data de-identification component 760 is configured to remove user identifying information (e.g., names, addresses, social security numbers, etc.) from the unlabeled training data 1035, resulting in de-identified unlabeled training data 1045. In some instances, the data de-identification component 760 may add information to a natural language input represented in the unlabeled training data 1035 in order to make the natural language input unusable for identifying the originating user. The data de-identification component 760 may use one or more art-known/industry-known data de-identification techniques and/or one or more proprietary data de-identification techniques.

The de-identified unlabeled training data 1045 may be sent to the labeling device 770. In some instances, the unlabeled training data 1035 may include one or more natural language inputs corresponding to an intent and/or including a named entity not yet configured into the runtime ML model(s). At the labeling device 770, a user may manually label (e.g., annotate) the natural language and/or non-natural language inputs, represented in the de-identified unlabeled training data 1045, resulting in the generation of de-identified manually labeled training data 1055. In some embodiments, if the data de-identification component 760 determines a natural language or non-natural language input, in the unlabeled training data 1035, is associated with profile data indicating a user provided authorization for the user to be identifiable, the data de-identification component 760 may simply pass the natural language or non-natural language input to the labeling device 770 without performing data de-identification processing on the natural language or non-natural language input.

The de-identified manually labeled training data 1055 may be input to a supervised learning component 1040. The supervised learning component 1040 may be configured to perform supervised learning (using labeled data) of the runtime ML model(s) based on the de-identified manually labeled training data 1055. By performing supervised learning, the supervised learning component 1040 trains the runtime ML model(s) to map inputs (e.g., the natural language or non-natural language inputs represented in the de-identified manually labeled training data 1055) to outputs (e.g., corresponding labels in the de-identified manually labeled training data 1055). Example supervised learning algorithms that may be implemented by the supervised learning component 1040 include linear regression algorithms, random forests, and support vector machines.

The model learning component 750 generates updated ML model data 725 using one or more of the incremental learning component 1010, weakly supervised learning component 1020, unsupervised learning component 1030, and/or supervised learning component 1040, depending on the type of training data involved in the training epoch. The updated ML model data 725 represents one or more weights, parameters, and/or other data corresponding to the updated runtime ML model. For example, the updated ML model data 725 may correspond to a number of layers/nodes in the updated ML model, one or more weights associated with each of the layers/nodes, values for various hyperparameters for the updated ML model, etc. A parameter may be a configuration variable that is internal to the ML model and whose value can be estimated/determined from the training data. A hyperparameter may be a configuration variable that is external to the ML model and whose value is usually set/defined manually.

Once a training epoch is performed as described above with respect to FIGS. 7-10, the model updating component 720 may cause the input data storage 710 to delete the data stored therein, and/or may cause the storages of the data categorizing component 740 to delete the data stored therein. As such, it will be appreciated that the data in the foregoing mentioned storages may correspond to inputs (e.g., natural language and/or non-natural language inputs) that was received after a previous training epoch and that is to be used for an upcoming training epoch. Thus, the system 120/device 110 need not store training data in perpetuity, thereby increasing user privacy.

As described, only a portion of the data, input to the model updating component 720, may undergo machine learning involving manual oversight (e.g., supervised learning). It will thus be appreciated that the teachings herein decrease the amount of data analyzed manually and externally to the system, and thus increases user privacy. Moreover, use of the data categorizing model 910, of the data categorizing component 740, to label at least some of the training data 705 may decrease an amount of time spent labeling training data as compared to a system that uses only manually labeled training data. Such may decrease the amount of time needed between training epochs, thereby resulting in better-performing runtime ML models and an improved user experience.

In some embodiments, the processing described above with respect to FIGS. 8-10 may be performed in response to the system 120/device 110 receiving a single input (e.g., a single natural language or non-natural language input). In other words, according to the present disclosure, a training epoch may be performed using a single or multiple natural language and/or non-natural language inputs.

Not every updated ML model may be implemented for runtime processing. In some embodiments, the system 120/device 110 may only implement an updated ML model at runtime if the updated ML model exhibits at least a threshold improvement in performance (with respect to one or more parameters) over the already implemented runtime ML model.

In some embodiments, an opt-in component (not illustrated) may be implemented between the annotation candidate storage 950 and the data de-identification component 760. The op-in component may be configured to determine whether a user, associated with an input represented in the unlabeled training data 1035, has provided authorization for a human to annotate the input (using the labeling device 770) without the input first undergoing data de-identification processing by the data de-identification component 760. The opt-in component may thus act as a filtering component in that, if the opt-in component determines an input is associated with a user that provided the foregoing authorization, the opt-in component may remove the input from the unlabeled training data 1035 (that is input to the data de-identification component 760) and send the input to the labeling device 770. In some embodiments, rather than removing the input from the unlabeled training data 1035, the opt-in component may associate the input with an indicator in the unlabeled training data 1035. The indicator may represent, to the data de-identification component 760, that only a portion of data de-identification processing need be performed with respect to the input.

Figure 11:
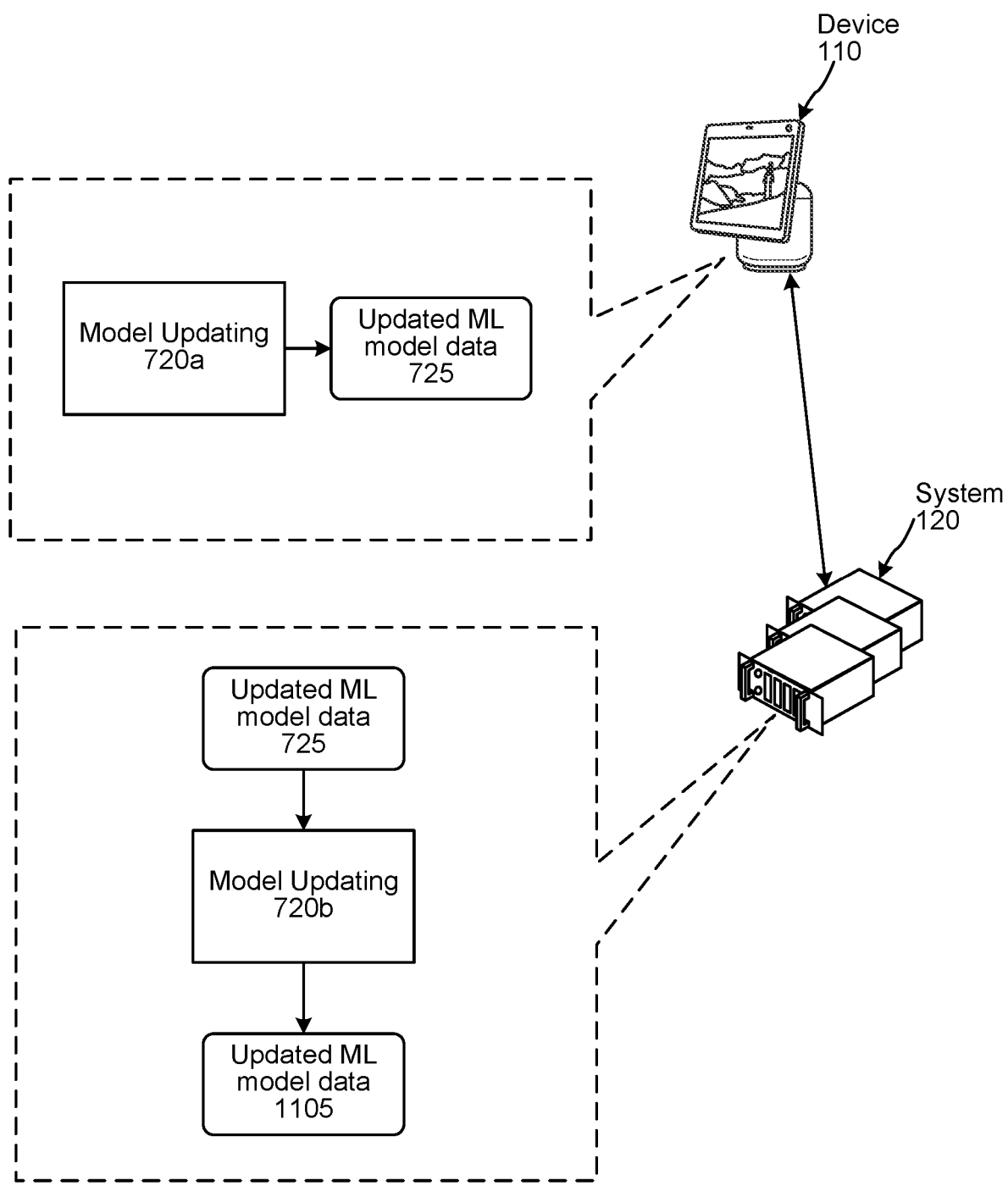
FIG. 11 is a conceptual diagram of how a ML model may be trained at a device, and resulting ML model data may be sent to a system for training a corresponding ML model implemented thereby, according to embodiments of the present disclosure.

FIG. 11 illustrates how the device 110 may update a ML model, and send resulting ML model data (representing the update) to the system 120 for updating a corresponding ML model implemented by the system 120. The device 110 may implement a model updating component 720*a* configured as described above. In the example of FIG. 11, the device 110 (or another device associated with the same profile data, such as a smart phone or tablet computer) may be used as the labeling device 770. The model updating component 720*a* generates the updated ML model data 725.

Since the model updating component 720*a* is implemented by the device 110, the training data, input to the model updating component 720*a*, may only representing natural language and non-natural language inputs received by the device 110. Thus, in the example of FIG. 11, the updated ML model data 725 may be specific to one or more users of the device 110. The device 110 sends the updated ML model data 725 to the system 120, wherein the updated ML model data 725 may be input to a model updating component 720*b*.

The device 110 and the system 120 may implement corresponding ML models trained with respect to different users. For example, the device 110 may implement an IC model trained specific to one or more users of the device 110, and the system 120 may implement an IC model trained specific to various users of the system 120, including but not limited to the one or more users of the device 110. For further example, the device 110 may implement a NER model trained specific to the one or more users of the device 110, and the system 120 may implement a NER model trained specific to various users of the system 120, including but not limited to the one or more users of the device 110.

The system 120 may input the updated ML model data 725 into a model updating component 720*b* (configured as described herein above) to generate updated ML model data 1105. Whereas the updated ML model data 725 is specific to the one or more users of the device 110, the updated ML model data 1105 may be specific to various users of the system 120, including but not limited to the one or more users of the device 110. It will be appreciated that the system 120 may receive updated ML model data 725 from various devices 110 associated with the system 120, and that the model updating component 720*b* may perform a training epoch using the various updated ML model data 725 to generate a single instance of the updated ML model data 1105.

Figure 12:
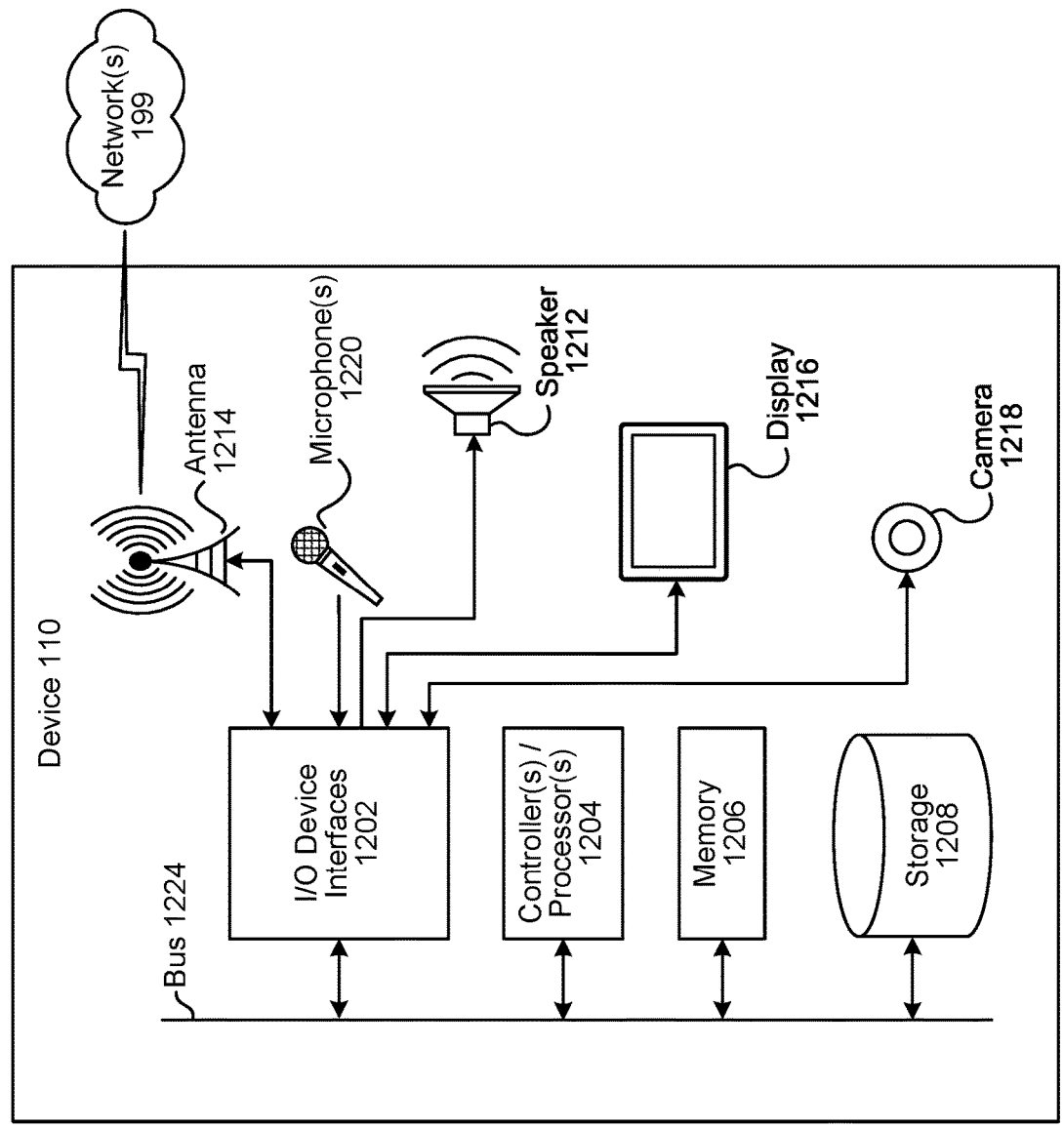
FIG. 12 is a block diagram conceptually illustrating example components of a device, according to embodiments of the present disclosure.
Figure 13:
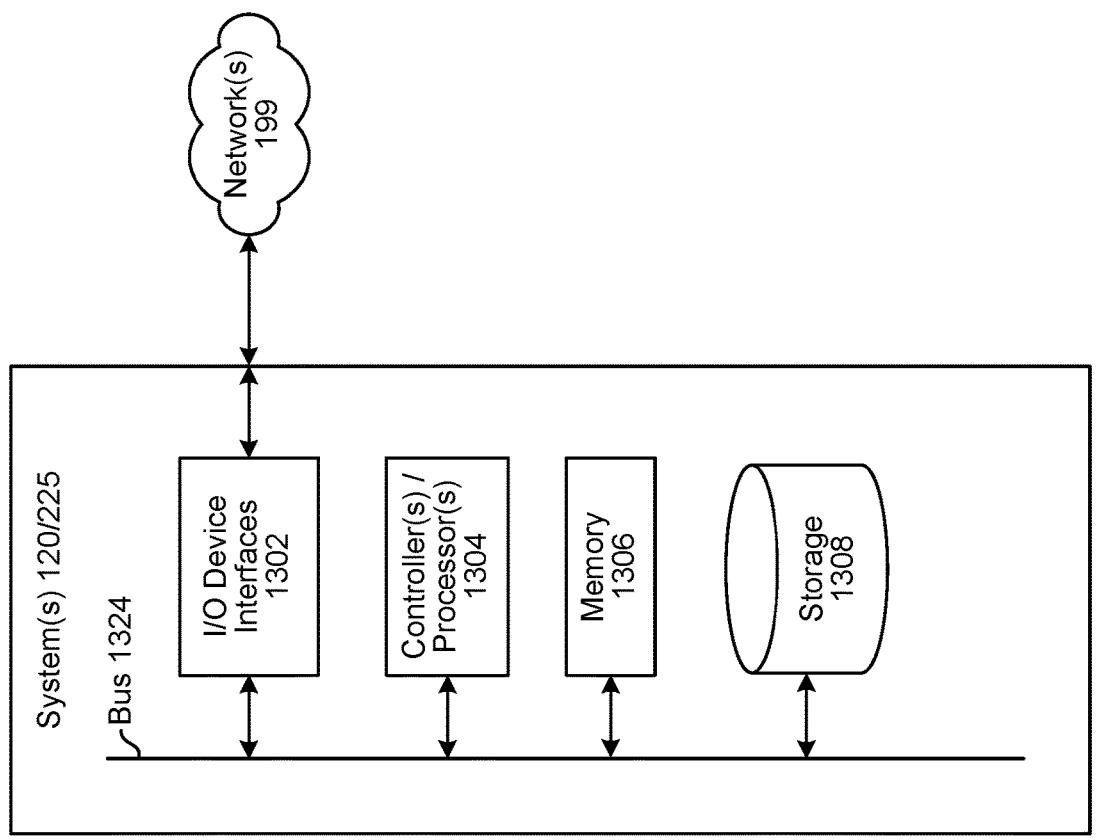
FIG. 13 is a block diagram conceptually illustrating example components of a system, according to embodiments of the present disclosure.

FIG. 12 is a block diagram conceptually illustrating a device 110 that may be used with the system 120. FIG. 13 is a block diagram conceptually illustrating example components of a remote device, such as the system 120 or a skill 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/225) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the system 100 of the present disclosure, such as one or more systems 120 and/or one or more skills 225. In operation, each of these systems may include computer-readable and computer-executable instructions that reside on the respective device (120/225), as will be discussed further below.

Each of these devices (110/120/225) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120/225) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1202/1302).

Computer instructions for operating each device (110/120/225) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120/225) includes input/output device interfaces (1202/1302). A variety of components may be connected through the input/output device interfaces (1202/1302), as will be discussed further below. Additionally, each device (110/120/225) may include an address/data bus (1224/1324) for conveying data among components of the respective device. Each component within a device (110/120/225) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 1212, a wired headset or a wireless headset (not illustrated), or other component capable of outputting audio. The device 110 may also include an audio capture component. The audio capture component may be, for example, a microphone 1220 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1216 for displaying content. The device 110 may further include a camera 1218.

Via antenna(s) 1214, the input/output device interfaces 1202 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/1302) may also include communication components that allow data to be exchanged between devices such as different physical servers in a collection of servers or other components.

The components of the device 110, the system 120, and/or the skill 225 may include their own dedicated processors, memory, and/or storage. Alternatively, one or more of the components of the device 110, the system 120, and/or the skill 225 may utilize the I/O interfaces (1202/1302), processor(s) (1204/1304), memory (1206/1306), and/or storage (1208/1308) of the device 110, the system 120, or the skill 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and the skill 225, as described herein, are illustrative, and may be located as a stand-alone device or may be included, in whole or in part, as a component of a larger device or system.

Figure 14:
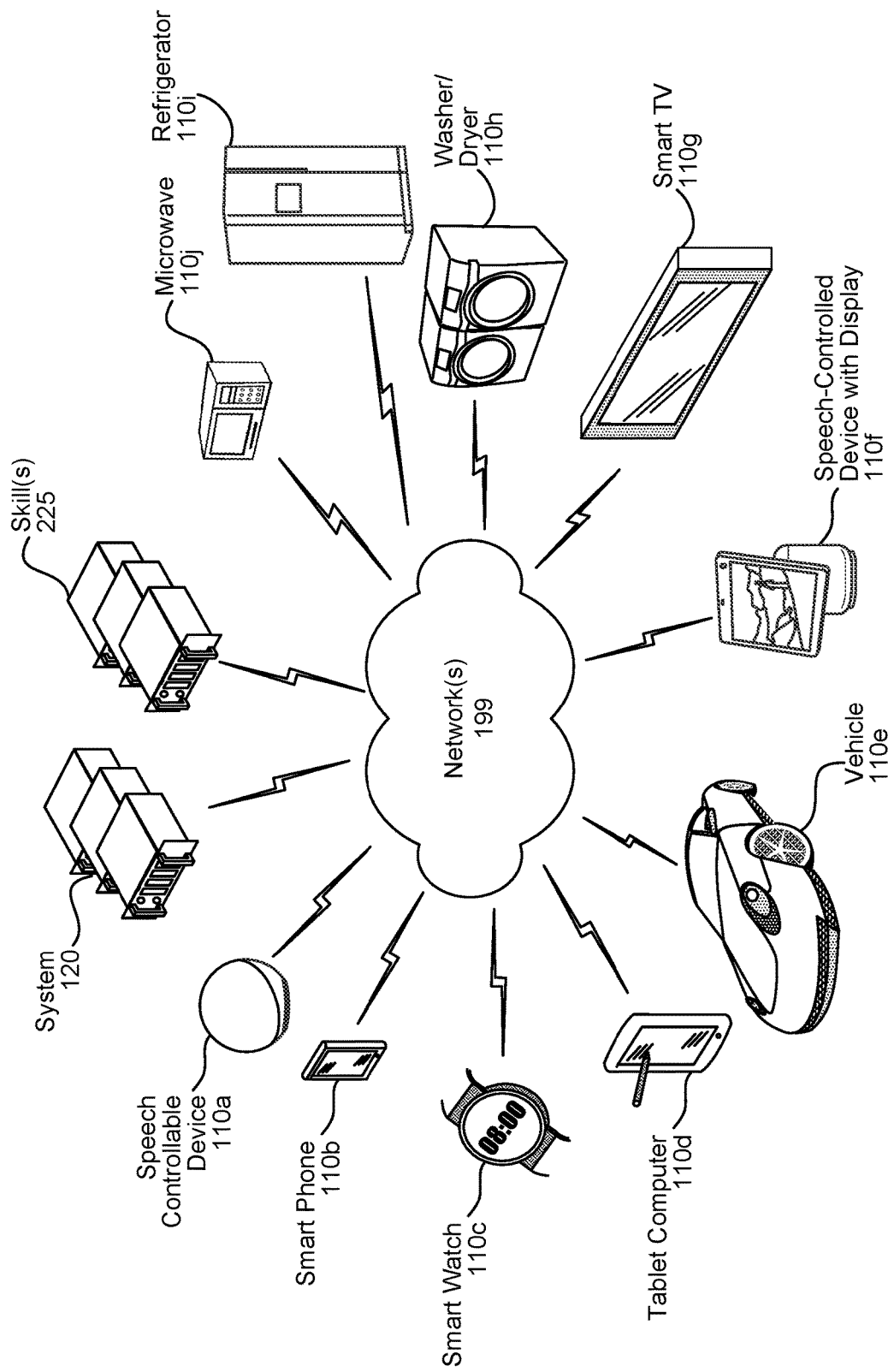
FIG. 14 illustrates an example of a computer network for use with the overall system, according to embodiments of the present disclosure.

As illustrated in FIG. 14, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the skill 225, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   processing, using a first machine learning (ML) model, first input data corresponding to a first user input to generate first output data representing the first user input;
   determining, using the first output data and a second ML model, that the first input data corresponds to a first training technique of a plurality of training techniques, the first training technique being incremental learning;
   performing, using the first input data and the first output data, incremental learning with respect to the first ML model to generate a first updated ML model; and
   deleting the first input data after generating the first updated ML model.

2. The computer-implemented method of claim 1, wherein determining that the first input data corresponds to the first training technique further comprises:
   determining, using the second ML model, that the first input data corresponds to an intent indicator; and
   determining that the first input data corresponds to the first training technique based at least in part on the second ML model determining that the first input data corresponds to the intent indicator.

3. The computer-implemented method of claim 1, further comprising:
   processing, using the first ML model, second input data corresponding to a second user input to generate second output data representing the second user input;
   determining the second input data is associated with a user feedback indicator; and
   determining, using the second ML model and based at least in part on the second input data being associated with the user feedback indicator, that the second input data corresponds to a second training technique of the plurality of training techniques, the second training technique being weakly supervised learning.

4. The computer-implemented method of claim 1, further comprising:
   processing, using the first ML model, second input data corresponding to a second user input to generate second output data representing the second user input;
   determining, using the second ML model, that the second input data is unassociated with an intent indicator; and
   determining, using the second ML model and based at least in part on the second input data being unassociated with the intent indicator, that the second input data corresponds to a second training technique of the plurality of training techniques, the second training technique being unsupervised learning.

5. The computer-implemented method of claim 1, further comprising:
   performing the incremental learning with respect to an automatic speech recognition (ASR) model to generate a first updated ASR model.

6. The computer-implemented method of claim 1, further comprising:
   performing the incremental learning with respect to a named entity recognition (NER) model to generate a first updated NER model.

7. The computer-implemented method of claim 1, further comprising:
   performing the incremental learning with respect to an intent classification (IC) model to generate a first updated IC model.

8. The computer-implemented method of claim 1, further comprising:
performing the incremental learning with respect to a gesture detection model to generate a first updated gesture detection model.

9. The computer-implemented method of claim 1, further comprising:
performing, by a first device, the incremental learning to generate first model data; and
sending, by the first device, the first model data to a second device, the second device configured to update a third ML model using the first model data.

10. A computing system comprising:
at least one processor; and
at least one memory comprising instructions that, when executed by the at least one processor, cause the computing system to:
process, using a first machine learning (ML) model, first input data corresponding to a first user input to generate first output data representing the first user input;
determine, using a second ML model, that the first input data corresponds to a first training technique of a plurality of training techniques, the first training technique being incremental learning;
perform, using the first input data and the first output data, incremental learning with respect to the first ML model to generate a first updated ML model; and
delete the first input data after generating the first updated ML model.

11. The computing system of claim 10, wherein the at least one memory further comprises instructions that, when executed by the at least one processor, further cause the computing system to:
determine, using the second ML model, that the first input data corresponds to an intent indicator; and
determine the first input data corresponds to the first training technique based at least in part on the second ML model determining the first input data corresponds to the intent indicator.

12. The computing system of claim 10, wherein the at least one memory further comprises instructions that, when executed by the at least one processor, further cause the computing system to:
process, using the first ML model, second input data corresponding to a second user input to generate second output data representing the second user input;
determine the second input data is associated with a user feedback indicator; and
determine, using the second ML model and based at least in part on the second input data being associated with the user feedback indicator, that the second input data corresponds to a second training technique of the plurality of training techniques, the second training technique being weakly supervised learning.

13. The computing system of claim 10, wherein the at least one memory further comprises instructions that, when executed by the at least one processor, further cause the computing system to:
process, using the first ML model, second input data corresponding to a second user input to generate second output data representing the second user input;
determine, using the second ML model, that the second input data is unassociated with an intent indicator; and
determine, using the second ML model and based at least in part on the second input data being unassociated with the intent indicator, that the second input data corresponds to a second training technique of the plurality of training techniques, the second training technique being unsupervised learning.

14. The computing system of claim 10, wherein the at least one memory further comprises instructions that, when executed by the at least one processor, further cause the computing system to:
perform the incremental learning with respect to an automatic speech recognition (ASR) model to generate a first updated ASR model.

15. The computing system of claim 10, wherein the at least one memory further comprises instructions that, when executed by the at least one processor, further cause the computing system to:
perform the incremental learning with respect to an named entity recognition (NER) model to generate a first updated NER model.

16. The computing system of claim 10, wherein the at least one memory further comprises instructions that, when executed by the at least one processor, further cause the computing system to:
perform the incremental learning with respect to an intent classification (IC) model to generate a first updated IC model.

17. The computing system of claim 10, wherein the at least one memory further comprises instructions that, when executed by the at least one processor, further cause the computing system to:
perform, by a first device, the incremental learning to generate first model data; and
send, by the first device, the first model data to a second device, the second device configured to update a third ML model using the first model data.

18. The computer-implemented method of claim 1, wherein determining that the first input data corresponds to the first training technique further comprises:
determining, using the first output data and the second ML model, that the first input data corresponds to a first indicator from a plurality of indicators, the plurality of indicators including at least one of an intent indicator, an entity indicator, or a domain indicator;
determining first data indicating a likelihood that the first indicator corresponds to the first input data;
determining that the first data satisfies a condition; and
determining that the first input data corresponds to the first training technique based on the second ML model determining that the first input data corresponds to the first indicator and the first data satisfying the condition.

19. The computer-implemented method of claim 1, wherein determining that the first input data corresponds to the first training technique further comprises:
determining, using the first output data and the second ML model, that the first input data corresponds to a first indicator from a plurality of indicators, the plurality of indicators including at least one of an intent indicator, an entity indicator, or a domain indicator; and
determining that the first input data corresponds to the first training technique based at least in part on the second ML model determining that the first input data corresponds to the first indicator, and
the method further comprises:
processing, using the first ML model, second input data corresponding to a second user input to generate second output data representing the second user input;

determining, using the second output data and the second ML model, that the second input data corresponds to a second indicator from the plurality of indicators;

determining that the second input data is associated with a user feedback indicator; and determining, based at least in part on the second input data being associated with the second indicator and the user feedback indicator, that the second input data corresponds to a second training technique of the plurality of training techniques, the second training technique being weakly supervised learning.

20. The computer-implemented method of claim 1, wherein determining that the first input data corresponds to the first training technique further comprises:

determining, using the first output data and the second ML model, that the first input data corresponds to a first indicator from a plurality of indicators, the plurality of indicators including at least one of an intent indicator, an entity indicator, or a domain indicator; and determining that the first input data corresponds to the first training technique based at least in part on the second ML model determining that the first input data corresponds to the first indicator, and the method further comprises:

processing, using the first ML model, second input data corresponding to a second user input to generate second output data representing the second user input;

determining, using the second output data and the second ML model, that the second input data is unassociated with the plurality of indicators; and determining, based at least in part on the second input data being unassociated with the plurality of indicators, that the second input data corresponds to a second training technique of the plurality of training technique, the second training technique being unsupervised learning.

21. A computer-implemented method comprising:

processing, using a first machine learning (ML) model, first input data corresponding to a first user input to generate first output data representing the first user input;

performing, based on the first output data, an action responsive to the first user input;

processing, using the first ML model, second input data corresponding to a second user input to generate second output data representing the second user input;

determining, using the second output data, that the second input data corresponds to user feedback responsive to the action;

associating the first input data with a user feedback indicator;

determining, using a second ML model and based at least in part on the first input data being associated with the user feedback indicator, that the first input data corresponds to a first training technique of a plurality of training techniques, the first training technique being weakly supervised learning;

performing, using the first input data and the first output data, weakly supervised learning with respect to the first ML model to generate a first updated ML model; and deleting the first input data after generating the first updated ML model.

\* \* \* \* \*